(12) United States Patent
Shirakawa et al.

(10) Patent No.: US 9,692,683 B2
(45) Date of Patent: Jun. 27, 2017

(54) COMMUNICATION VISUALIZATION SYSTEM

(71) Applicant: Hitachi Metals, Ltd., Minato-ku, Tokyo (JP)

(72) Inventors: Yohei Shirakawa, Hitachi (JP); Koki Hirano, Hitachinaka (JP); Takumi Kobayashi, Hitachi (JP); Yoshitake Ageishi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/816,814

(22) Filed: Aug. 3, 2015

(65) Prior Publication Data

US 2016/0036662 A1    Feb. 4, 2016

(30) Foreign Application Priority Data

Aug. 4, 2014 (JP) ................................ 2014-158735

(51) Int. Cl.
   *H04L 12/26* (2006.01)
   *H04L 12/10* (2006.01)
   *G08B 5/36* (2006.01)

(52) U.S. Cl.
   CPC .............. *H04L 43/50* (2013.01); *H04L 12/10* (2013.01); *H04L 43/0811* (2013.01); *G08B 5/36* (2013.01)

(58) Field of Classification Search
   CPC ....... H04L 43/50; H04L 43/0811; H04L 12/10
   See application file for complete search history.

(56) References Cited

U.S. PATENT DOCUMENTS

| 7,019,658 B1 * | 3/2006 | Erickson .............. H01R 13/641 340/635 |
| 2010/0120264 A1 | 5/2010 | Caveney et al. |

FOREIGN PATENT DOCUMENTS

JP    2012-508956 A    4/2012

* cited by examiner

*Primary Examiner* — Leon Flores
(74) *Attorney, Agent, or Firm* — Crowell & Moring LLP

(57) ABSTRACT

A communication visualization system includes a wireless power-feeding device for transmitting electromagnetic energy in a wireless manner and a communication visualization device for notifying that a LAN cable connected to an information communication apparatus is performing information communication. The communication visualization device includes an antenna part for receiving the electromagnetic energy transmitted from the wireless power-feeding device, a rectifier circuit for rectifying the electromagnetic energy received by the antenna part to generate a DC voltage, an amplifier circuit for amplifying a communication signal transferred to the communication cable at the time of information communication by using the DC voltage generated by the rectifier circuit as operation power, a rectifier circuit for converting the amplified communication signal into a DC voltage, and a light-emitting circuit for emitting light when the DC voltage after conversion is supplied.

12 Claims, 17 Drawing Sheets

COMMUNICATION VISUALIZATION SYSTEM

CROSS-REFERENCE TO RELATED APPLICATION

The present application claims priority from Japanese Patent Application No. 2014-158735 filed on Aug. 4, 2014, the content of which is hereby incorporated by reference into this application.

TECHNICAL FIELD

The present invention relates to a communication visualization system, and in particular, to a technology of visualizing an existence or nonexistence of communication through a communication cable.

BACKGROUND

In a data center or the like, connections of communication cables, such as local area network (LAN) cables, are changed due to layout change, movement, or extension of an information communication apparatus, such as a server or a hub.

There is an information communication apparatus including a lamp for connection check which enables a connection of the communication cable to be checked. The lamp is installed in, for example, a connector or the like which connects communication cables mounted on the information communication apparatus.

The lamp is turned on when the communication cable is connected to the connector and communication is established between information communication apparatuses. When the communication cable is separated from the connector of the information communication apparatus, the lamp is turned off.

In addition, there is another information communication apparatus in which a lamp for connection check is installed in a connector portion of a communication cable side. Similarly, when the communication cable is connected to a connector of the information communication apparatus, the lamp is turned on. When the communication cable is separated from the connector of the information communication apparatus, the lamp is turned off.

As a technology of checking connection of communication cables, there is known a technology of detecting insertion or removal of a patch cord or a plug and monitoring connection of the patch cord in an patching environment (for example, see Japanese Patent Application Laid-Open Publication (Translation of a PCT Application) No. 2012-508956).

SUMMARY

In recent years, as various services are concentrated, a network inside a data center has been complicated. For example, when an integrated information communication apparatus is wired in a distal place, it is hard to identify a removal target communication cable by using only the lamp for connection check and there is apprehended that a communication cable is incorrectly removed.

In particular, when a communication cable is incorrectly removed during data communication, it is likely that a service of the information communication apparatus is stopped and data which is being transmitted is damaged.

In addition, installation of the lamp in the connector portion of the communication cable requires an additional dedicated communication cable including a wiring which detects whether the communication cable is connected to the connector. Therefore, cost increases and a diameter and weight of the communication cable increase, resulting in reduction of workability.

In addition, it is necessary to prepare a special connector equipped with a dedicated communication cable, or the like, causing an increment in cost. In order to replace an existing communication cable with a dedicated communication cable, large-scale changing operation is performed.

The present invention provides a technology of visually checking an existence or nonexistence of information communication through a communication cable inexpensively and easily.

The above and other preferred aims and novel characteristics of the present invention will be apparent from the description of the present specification and the accompanying drawings.

The typical ones of the inventions disclosed in the present application will be briefly described as follows.

A communication visualization system according to an aspect of the present invention includes: a wireless power-feeding device for transmitting electromagnetic energy in a wireless manner; and a communication visualization device for notifying that a communication cable connected to an information communication apparatus is performing information communication at time of information communication.

The communication visualization device includes: an antenna part; a first rectifying part; an amplifying part; a second rectifying part; and a light-emitting part. The antenna part receives the electromagnetic energy transmitted from the wireless power-feeding device. The first rectifying part rectifies the electromagnetic energy received by the antenna part to generate a DC voltage.

The amplifying part amplifies a part of a communication signal transferred to the communication cable at time of information communication by using the DC voltage generated by the first rectifying part as operation power. The second rectifying part converts the communication signal amplified by the amplifying part into a DC voltage. The light-emitting part emits light based on the DC voltage obtained by conversion by the second rectifying part.

A communication visualization system according to another aspect of the present invention includes: a power-feeding device for supplying power; and a communication visualization device for notifying that a communication cable connected to an information communication apparatus is performing information communication at time of information communication.

The communication visualization system includes: an amplifying part; a rectifying part; and a light-emitting part. The amplifying part amplifies a part of a communication signal transferred to the communication cable at time of information communication. The rectifying part converts the communication signal amplified by the amplifying part into a DC voltage. The light-emitting part emits light based on the DC voltage obtained by conversion by the rectifying part. In addition, the amplifying part operates with power supplied from the power-feeding device.

In the communication visualization system according to the another aspect of the present invention, the communication signal inputted to the amplifying part is a pair of differential signals transmitted from the information communication apparatus which performs communication.

In the communication visualization system according to the another aspect of the present invention, the communication visualization device further includes a matching part for limiting a current value of the communication signal flowing through the amplifying part.

In the communication visualization system according to the another aspect of the present invention, the communication visualization device is accommodated in a connector plug included in the communication cable.

In the communication visualization system according to the another aspect of the present invention, the communication visualization device is installed in an extension adapter for connecting the communication cables to achieve extension.

In the communication visualization system according to the another aspect of the present invention, the communication visualization device is installed in a wiring panel which concentrates a plurality of the communication cables.

It is possible to visually check an existence or nonexistence of information communication transferred by a communication cable.

BRIEF DESCRIPTIONS OF THE DRAWINGS

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and a repetitive description thereof is omitted.

First Embodiment

<Configuration Example of Communication Visualization System>

Figure 1:
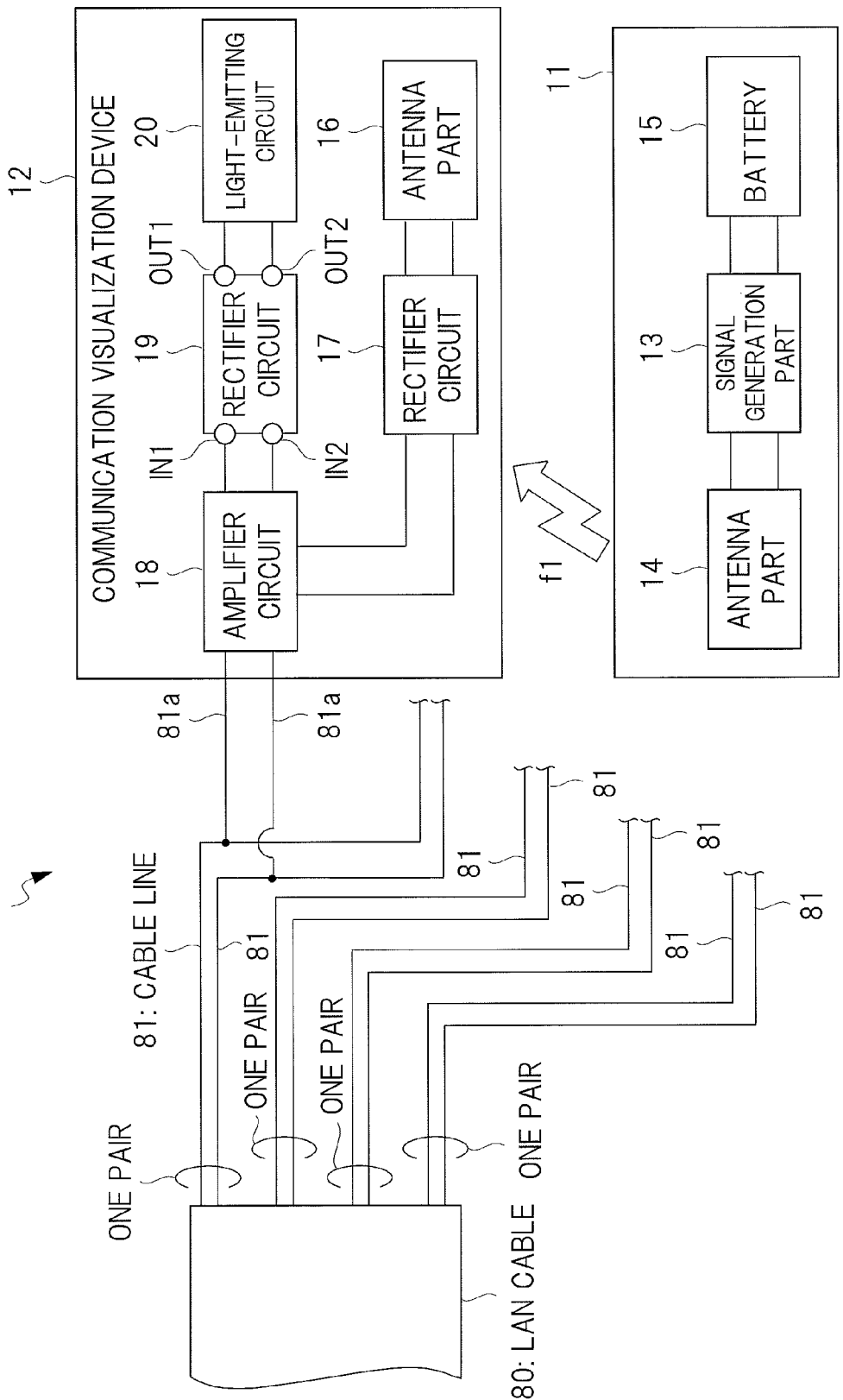
FIG. 1 is a diagram illustrating a configuration example of a communication visualization system according to a first embodiment of the present invention.

FIG. 1 is a diagram illustrating a configuration example of a communication visualization system 10 according to a first embodiment of the present invention. The communication visualization system 10 visually checks whether a communication signal is transferred by, for example a LAN cable 80 or the like.

Referring to FIG. 1, the communication visualization system 10 includes a wireless power-feeding device 11 and a communication visualization device 12. The wireless power-feeding device 11, which is a power-feeding device, feeds power to the communication visualization device 12 in a wireless manner.

The communication visualization device 12 is provided in a LAN cable 80 which is a communication cable, and allows a user to visually recognize that the LAN cable 80 is transferring a communication signal through light emission. The communication visualization device 12 operates with power fed from the wireless power-feeding device 11. A specific example of attachment of the communication visualization device 12 to the LAN cable 80 will be described with reference to FIGS. 10 and 11 or the like to be described below.

The LAN cable 80 is inserted into a socket of a LAN connector installed in an information communication apparatus which performs information communication, for example, a server installed in a data center or the like, and is a communication cable which transfers a communication signal between information communication apparatuses connected to one another.

<Configuration Example of Wireless Power-Feeding Device>

As illustrated in FIG. 1, the wireless power-feeding device 11 includes a signal generation part 13, an antenna part 14, and a battery 15. The signal generation part 13 generates, for example, a basic high frequency electromagnetic energy that is a continuous sine wave and has an almost constant amplitude. Specifically, the basic high frequency electromagnetic energy is a sine wave f1 having a frequency of, for example, about several KHz to about several GHz. The antenna part 14 transmits the sine wave f1 generated by the signal generation part 13.

The battery 15 supplies power to the signal generation part 13. The signal generation part 13 uses the power supplied from the battery 15 as operation power.

<Configuration Example of Communication Visualization Device>

As illustrated in FIG. 1, the communication visualization device 12 includes an antenna part 16, a rectifier circuit 17, an amplifier circuit 18, a rectifier circuit 19, and a light-emitting circuit 20.

The antenna part 16 is a reception antenna, and receives the sine wave f1 transmitted from the wireless power-feeding device 11. The rectifier circuit 17, which is a first rectifying part, rectifies the sine wave f1 received by the antenna part 16 and converts the sine wave f1 into a DC voltage to output the DC voltage to the amplifier circuit 18. The DC voltage output from the rectifier circuit 17 becomes operation power of the amplifier circuit 18.

The LAN cable 80 is a popular product used in Ethernet LAN or the like, and includes cable lines 81 each containing eight copper wires and the like. Ethernet is a registered trademark. Two cable lines 81 constitute one fair and total four pairs are formed. Differential signals are transferred to each pair of two cable lines 81 as communication signals.

Parts of differential signals, which are transferred to two cable lines 81 constituting certain one pair, among the cable lines 81 constituting the four fairs, are input to an input part of the amplifier circuit 18 which is an amplifying part via branch cable lines 81a.

The amplifier circuit 18 amplifies and outputs the differential signals input to the input part. The amplifier circuit 18 can perform amplification for low noise having a high-frequency by using, for example, a low noise amplifier (LNA).

The rectifier circuit 19 which is a second rectifying part rectifies the differential signals amplified by the amplifier circuit 18 and outputs a DC voltage. The differential signals amplified by the amplifier circuit 18 are respectively input to input parts IN1 and IN2 of the rectifier circuit 19. The DC voltage obtained through rectification by the rectifier circuit 19 is output from output parts OUT1 and OUT2.

The DC voltage output from the output parts OUT1 and OUT2 of the rectifier circuit 19 are supplied to the light-emitting circuit 20 which is a light-emitting part. The light-emitting circuit 20 emits light by the DC voltage output from the output parts OUT1 and OUT2 of the rectifier circuit 19.

In this way, the light-emitting circuit 20 emits light by using a signal obtained in such a way that the amplifier circuit 18 amplifies the differential signals input through the branch cable lines 81a. In addition, the amplifier circuit 18 is driven by operation power supplied from the wireless power-feeding device 11. Therefore, it is possible to stabilize light emission in the light-emitting circuit 20, regardless of magnitudes of the differential signals input from the branch cable lines 81a.

<Configuration Example of Rectifier Circuit>

Subsequently, the rectifier circuit 19 will be described.

FIGS. 2 to 5 are diagrams illustrating circuit configuration examples of the rectifier circuit 19 provided in the communication visualization device 12 of FIG. 1. Although a configuration of the rectifier circuit 19 is descried therein, it may be assumed that the rectifier circuit 17 provided in the communication visualization device 12 of FIG. 1 has the same configuration.

Figure 2:
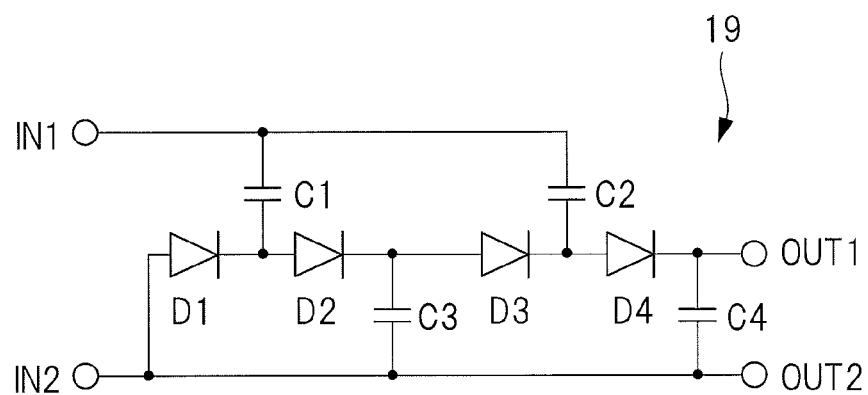
FIG. 2 is a diagram illustrating a circuit configuration example of a rectifier circuit provided in a communication visualization device of FIG. 1.

The rectifier circuit 19 illustrated in FIG. 2 includes capacitors C1 to C4 for DC-cutting and diodes D1 to D4 each including a Schottky barrier diode.

One ends of the capacitors C1 and C2 are connected to one input part IN1 of the rectifier circuit 19. The other input part IN2 of the rectifier circuit 19 and the outer output part OUT2 of the rectifier circuit 19 are connected to an anode of the diode D1 and the other ends of the capacitors C3 and C4.

Output parts of the amplifier circuit 18 are respectively connected to the input parts IN1 and IN2 of the rectifier circuit 19. An anode of the diode D2 and one end of the capacitor C1 are connected to a cathode of the diode D1. An anode of the diode D3 and the other end of the capacitor C3 are connected to a cathode of the diode D2. An anode of the diode D4 and the other end of the capacitor C2 are connected to a cathode of the diode D3.

One end of the capacitor C4 is connected to a cathode of the diode D4. A connection portion between the cathode of the diode D4 and one end of the capacitor C4 becomes the output part OUT1 of the rectifier circuit 19. The DC voltage is output from the output parts OUT1 and OUT2 of the rectifier circuit 19.

Figure 3:
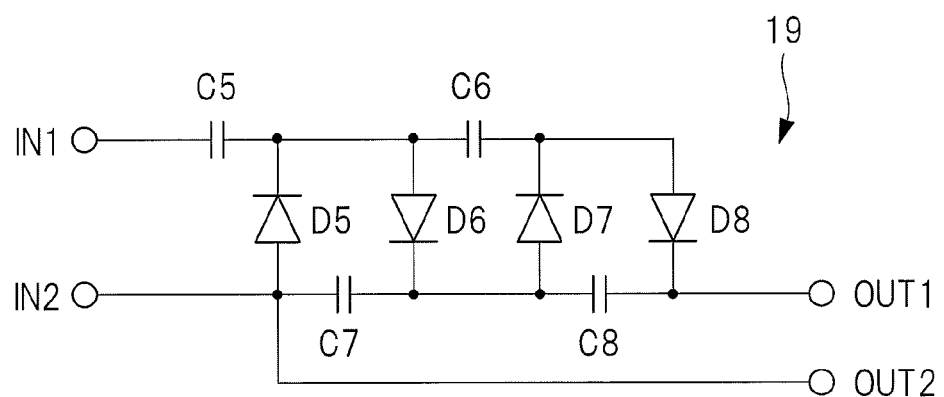
FIG. 3 is a diagram illustrating another circuit configuration example of a rectifier circuit provided in the communication visualization device of FIG. 1.

The rectifier circuit 19 illustrated in FIG. 3 includes capacitors C5 to C8 for DC-cutting and diodes D5 to D8 each including a Schottky barrier diode. One input part IN1 of the rectifier circuit 19 is connected to one end of the capacitor C5. The other input part IN2 of the rectifier circuit 19 is connected to an anode of the diode D5 and one end of the capacitor C7.

The output parts of the amplifier circuit 18 are respectively connected to the input parts IN1 and IN2 of the rectifier circuit 19. A cathode of the diode D5, an anode of the diode D6, and the other end of the capacitor C6 are connected to the other end of the capacitor C5. A cathode of the diode D6, an anode of the diode D7, and one end of the capacitor C8 are connected to the other end of the capacitor C7.

A cathode of the diode D7 and an anode of the diode D8 are connected to the other end of the capacitor C6. The other end of the capacitor C8 is connected to a cathode of the diode D8.

A connection portion between the diode D5 and the capacitor C7 becomes one output part OUT2 of the rectifier circuit 19, and a connection portion between the diode D8 and the capacitor C8 becomes the other output part OUT1 of the rectifier circuit 19. The DC voltage is output from the output parts OUT1 and OUT2 of the rectifier circuit 19.

Figure 4:
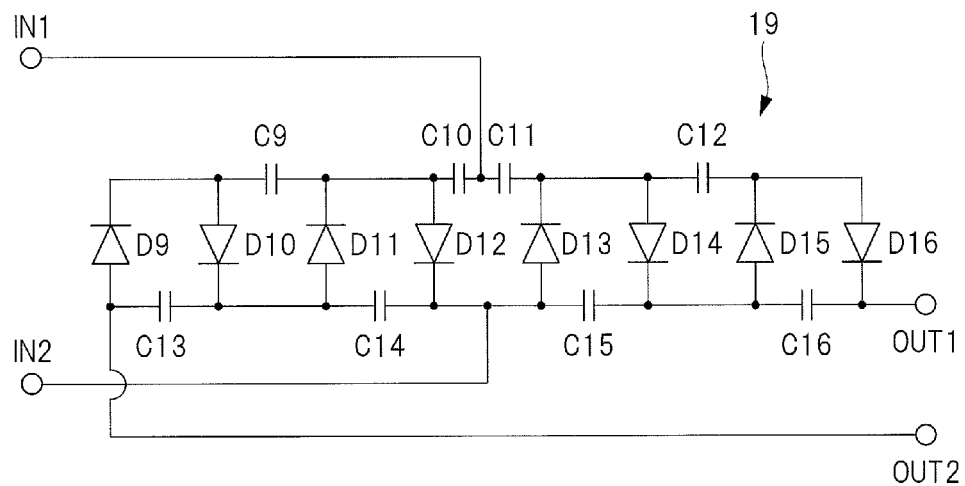
FIG. 4 is a diagram illustrating another circuit configuration example of a rectifier circuit provided in the communication visualization device of FIG. 1.

The rectifier circuit 19 illustrated in FIG. 4 includes capacitors C9 to C16 for DC-cutting and diodes D9 to D16 each including a Schottky barrier diode. One ends of the capacitors C10 and C11 are connected to one input part IN1 of the rectifier circuit 19. A cathode of the diode D12, an anode of the diode D13, and one ends of the capacitors C14 and C15 are connected to the other input part IN2 of the rectifier circuit 19.

The output parts of the amplifier circuit 18 are respectively connected to the input parts IN1 and IN2 of the rectifier circuit 19. A cathode of the diode D11, an anode of the diode D12, and one end of the capacitor C9 are connected to the other end of the capacitor C10. An anode of the diode D10 and a cathode of the diode D9 are connected to the other end of the capacitor C9.

One end of the capacitor C13 is connected to an anode of the diode D9. A cathode of the diode D10, an anode of the diode D11, and the other end of the capacitor C14 are connected to the other end of the capacitor C13.

A cathode of the diode D13, an anode of the diode D14, and one end of the capacitor C12 are connected to the other end of the capacitor C11. A cathode of the diode D15 and an anode of the diode D16 are connected to the other end of the capacitor C12.

A cathode of the diode D14, an anode of the diode D15, and one end of the capacitor C16 are connected to the other end of the capacitor C15. A cathode of the diode D16 is connected to the other end of the capacitor C16.

A connection portion between the capacitor C16 and the diode D16 becomes one output part OUT1 of the rectifier circuit 19, and a connection portion between the diode D9 and the capacitor C13 becomes the other output part OUT2 of the rectifier circuit 19. The DC voltage is output from the output parts OUT1 and OUT2 of the rectifier circuit 19.

Figure 5:
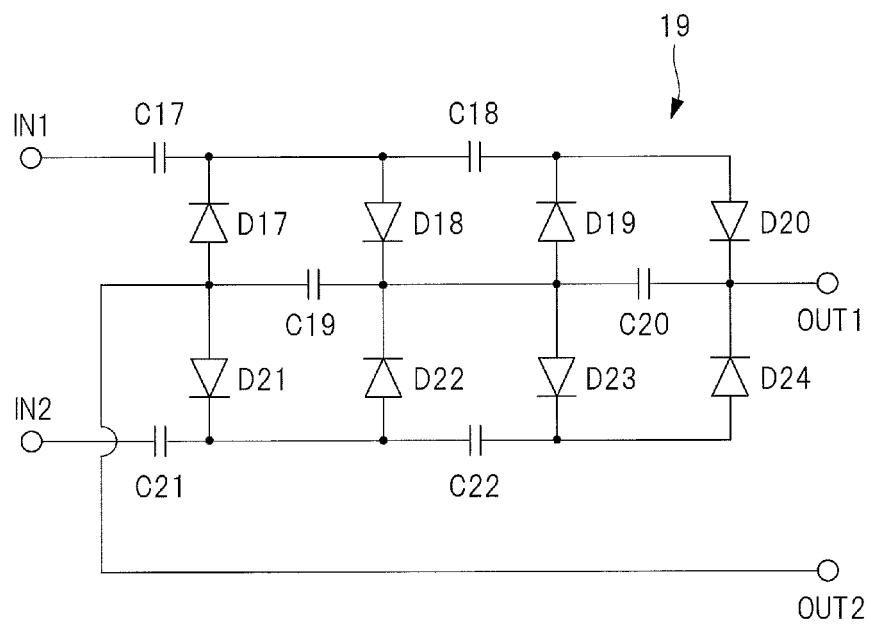
FIG. 5 is a diagram illustrating another circuit configuration example of a rectifier circuit provided in the communication visualization device of FIG. 1.

The rectifier circuit 19 illustrated in FIG. 5 includes capacitors C17 to C22 for DC-cutting and diodes D17 to D24 each including a Schottky barrier diode.

One end of the capacitor C17 is connected to one input part IN1 of the rectifier circuit 19, and one end of the capacitor C21 is connected to the other input part IN2 of the rectifier circuit 19. The output parts of the amplifier circuit 18 are respectively connected to the input parts IN1 and IN2 of the rectifier circuit 19.

A cathode of the diode D17, an anode of the diode D18, and the other end of the capacitor C18 are connected to one end of the capacitor C17. A cathode of the diode D19 and an anode of the diode D20 are connected to the other end of the capacitor C18.

A cathode of the diode D21, an anode of the diode D22, and one end of the capacitor C22 are connected to the other end of the capacitor C21. An anode of the diode D21 and one end of the capacitor C19 are connected to an anode of the diode D17.

One end of the capacitor C20, cathodes of the diodes D18 and D22, and anodes of the diodes D19 and D23 are connected to the other end of the capacitor C19. A cathodes of the diodes D20 and D24 are connected to the other end of the capacitor C20. A cathode of the diode D23 and an anode of the diode D24 are connected to the other end of the capacitor C22.

A connection portion between the capacitor C20 and the diodes D20 and D24 becomes one output part OUT1 of the rectifier circuit 19, and a connection portion between the capacitor C19 and the diodes D17 and D21 becomes the other output part OUT2 of the rectifier circuit 19. The DC voltage is output from the output parts OUT1 and OUT2 of the rectifier circuit 19.

The rectifier circuit 19 respectively illustrated in FIGS. 2 to 4 is configured by, for example, a double voltage half-wave rectification circuit and the rectifier circuit 19 illustrated in FIG. 5 is configured by, for example, a double voltage full-wave rectification circuit.

<Configuration Example of Light-Emitting Circuit>

Next, the light-emitting circuit 20 will be described.

Figure 6:
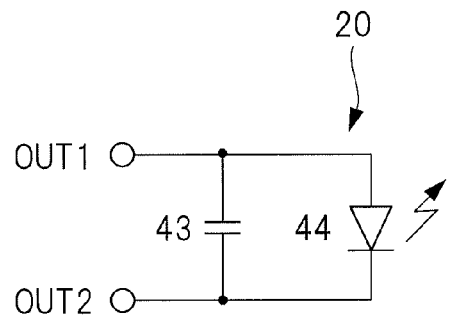
FIG. 6 is a diagram illustrating a circuit example of a light-emitting circuit provided in the communication visualization device of FIG. 1.

FIG. 6 is a diagram illustrating a circuit example of the light-emitting circuit 20 provided in the communication visualization device 12 of FIG. 1.

As illustrated in FIG. 6, the light-emitting circuit 20 includes a capacitor 43 for high-frequency removal and a light-emitting diode (LED) 44. The output part OUT1 of the rectifier circuit 19 is connected to one end of the capacitor 43 and an anode of the light-emitting diode 44. The output part OUT2 of the rectifier circuit 19 is connected to the other end of the capacitor 43 and a cathode of the light-emitting diode 44.

The light-emitting diode 44 emits light with the DC voltage supplied from the rectifier circuit 19. In addition, a high-frequency component output from the rectifier circuit 19 is removed by the capacitor 43. Thus, the DC voltage from which the high-frequency component, that is, a noise component, is removed is applied to the light-emitting diode 44, resulting in stabilization of light emission in the light-emitting diode 44.

<Another Configuration Example 1 of Light-Emitting Circuit>

Figure 7:
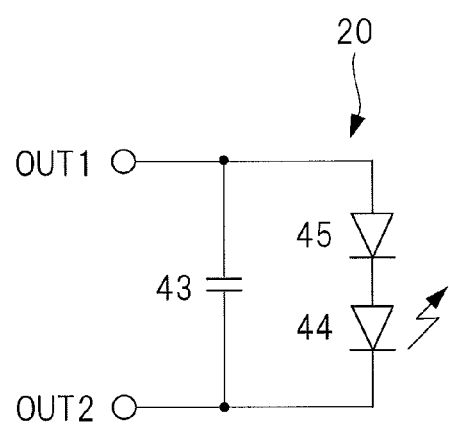
FIG. 7 is a diagram illustrating another configuration example of the light-emitting circuit of FIG. 6.

FIG. 7 is a diagram illustrating another configuration example of the light-emitting circuit 20 of FIG. 6.

Since the DC voltage supplied from the rectifier circuit 19 is a signal amplified by the amplifier circuit 18, there is a case where the supplied DC voltage is not stabilized due to a variation in a voltage level of the cable line 81, or the like.

In FIG. 7, there is provided a circuit configuration which stably emits light although a fluctuation in the DC voltage output from the rectifier circuit 19 occurs.

The light-emitting circuit 20 illustrated in FIG. 7 further includes a current regulative diode (CRD) 45 in addition to the capacitor 43 and the light-emitting diode 44 which are illustrated in FIG. 6.

The output part OUT1 of the rectifier circuit 19 is connected to an anode of the current regulative diode 45, and an anode of the light-emitting diode 44 is connected to a cathode of the current regulative diode 45.

The output part OUT2 of the rectifier circuit 19 is connected to a cathode of the light-emitting diode 44. Similarly to FIG. 6, the capacitor 43 is connected between the output parts OUT1 and OUT2 of the rectifier circuit 19.

The current regulative diode 45 operates such that an almost constant current flows although a fluctuation in the DC voltage supplied by the rectifier circuit 19 occurs. Accordingly, although a fluctuation in the DC voltage output from the rectifier circuit 19 occurs, it is possible to stabilize light emission in the light-emitting diode 44.

<Another Configuration Example 2 of Light-Emitting Circuit>

Figure 8:
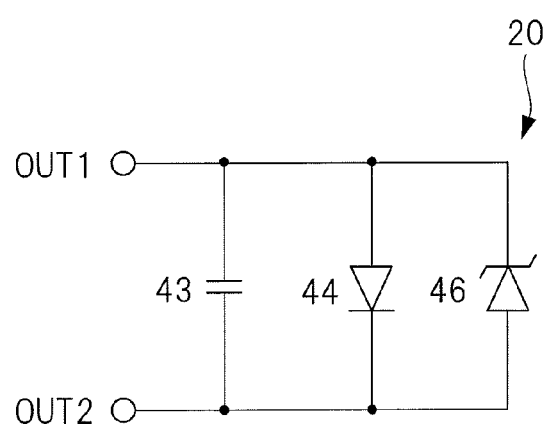
FIG. 8 is a diagram illustrating another configuration example of the light-emitting circuit of FIG. 6.

FIG. 8 is a diagram illustrating another configuration example of the light-emitting circuit 20 of FIG. 6.

The light-emitting circuit 20 illustrated in FIG. 8 further includes a zener diode 46 in addition to the capacitor 43 and the light-emitting diode 44 which are illustrated in FIG. 6. The output part OUT1 of the rectifier circuit 19 is connected to a cathode of the zener diode 46, and the output part OUT2 of the rectifier circuit 19 is connected to an anode of the zener diode 46. Since a connection configuration between the capacitor 43 and the light-emitting diode is similar to that described with reference to FIG. 6, a description thereof will be omitted.

When the DC voltage output from the rectifier circuit 19 becomes larger than a zener voltage, the zener diode 46 allows a current to flow in the reverse direction, stabilizing the DC voltage output from the rectifier circuit 19. Therefore, it is possible to practically stabilize light emission in the light-emitting diode 44.

<Another Configuration Example 3 of Light-Emitting Circuit>

Figure 9:
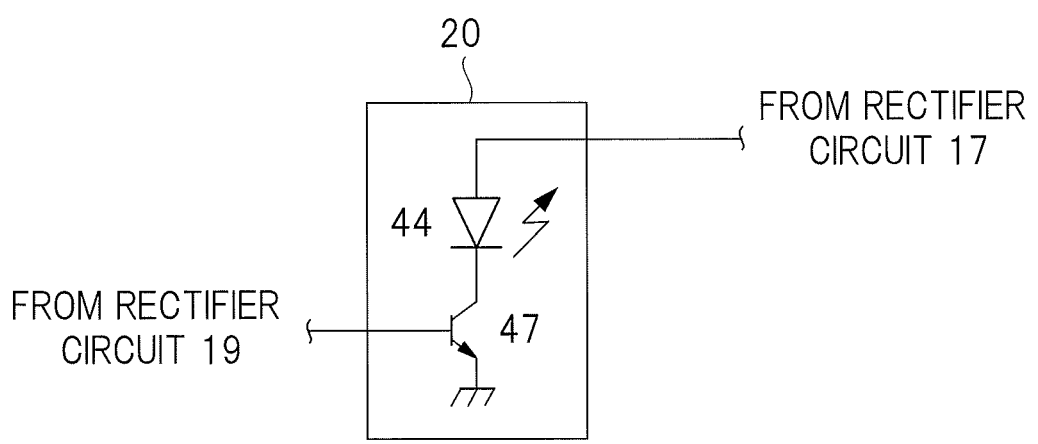
FIG. 9 is a diagram illustrating another configuration example of the light-emitting circuit of FIG. 6.

FIG. 9 is a diagram illustrating another configuration example of the light-emitting circuit 20 of FIG. 6.

The light-emitting circuit 20 illustrated in FIG. 9 includes a light-emitting diode 44 and a transistor 47 which is of, for example, a bipolar-type. A collector of the transistor 47 is connected to a cathode of the light-emitting diode 44. A DC voltage output from the rectifier circuit 17 illustrated in FIG. 1 is supplied to an anode of the light-emitting diode 44 and an emitter of the transistor 47.

In addition, a differential signal output from the rectifier circuit 19 is input to a base of the transistor 47. When the base of the transistor 47 is at a Hi level, the transistor 47 is turned on, and the light-emitting diode 44 emits light. By appropriately setting a threshold voltage of the transistor 47, stable light emission operation can be archived even when the DC voltage input from the rectifier circuit 19 is unstable.

<Configuration Example of LAN Cable>

Subsequently, a configuration of a LAN cable equipped with the communication visualization device 12 will be described.

Figure 10:
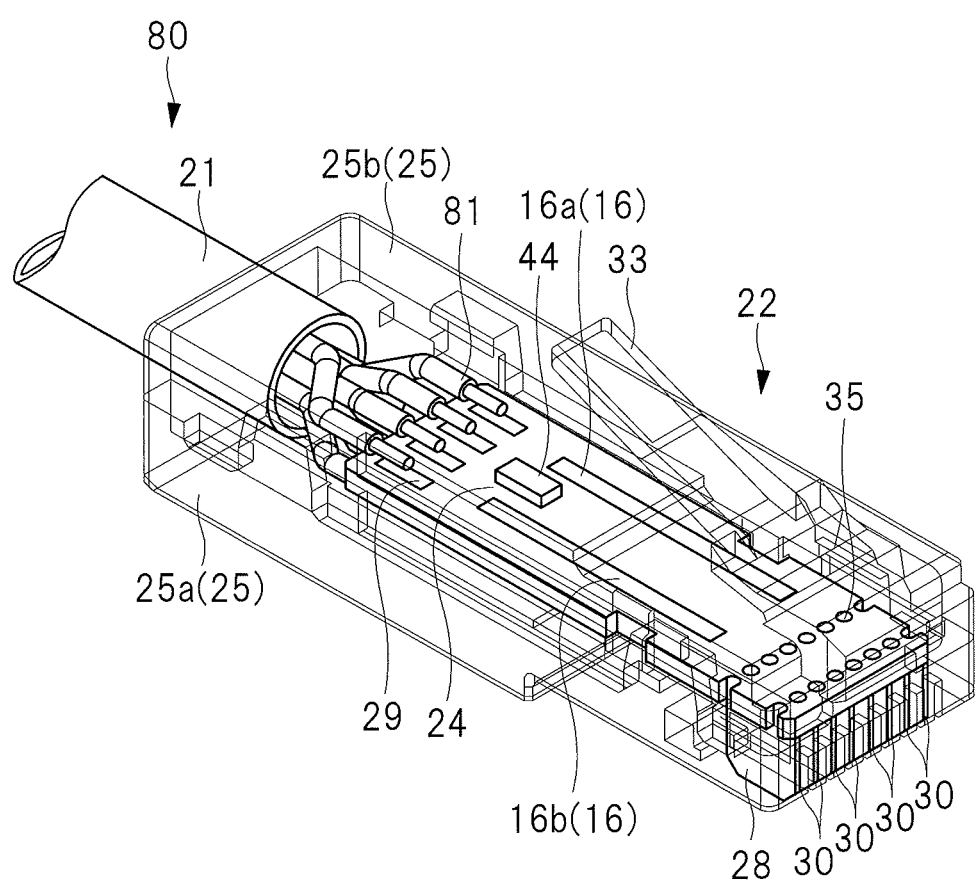
FIG. 10 is a diagram illustrating a configuration example of a LAN cable including the communication visualization device of FIG. 1.
Figure 11:
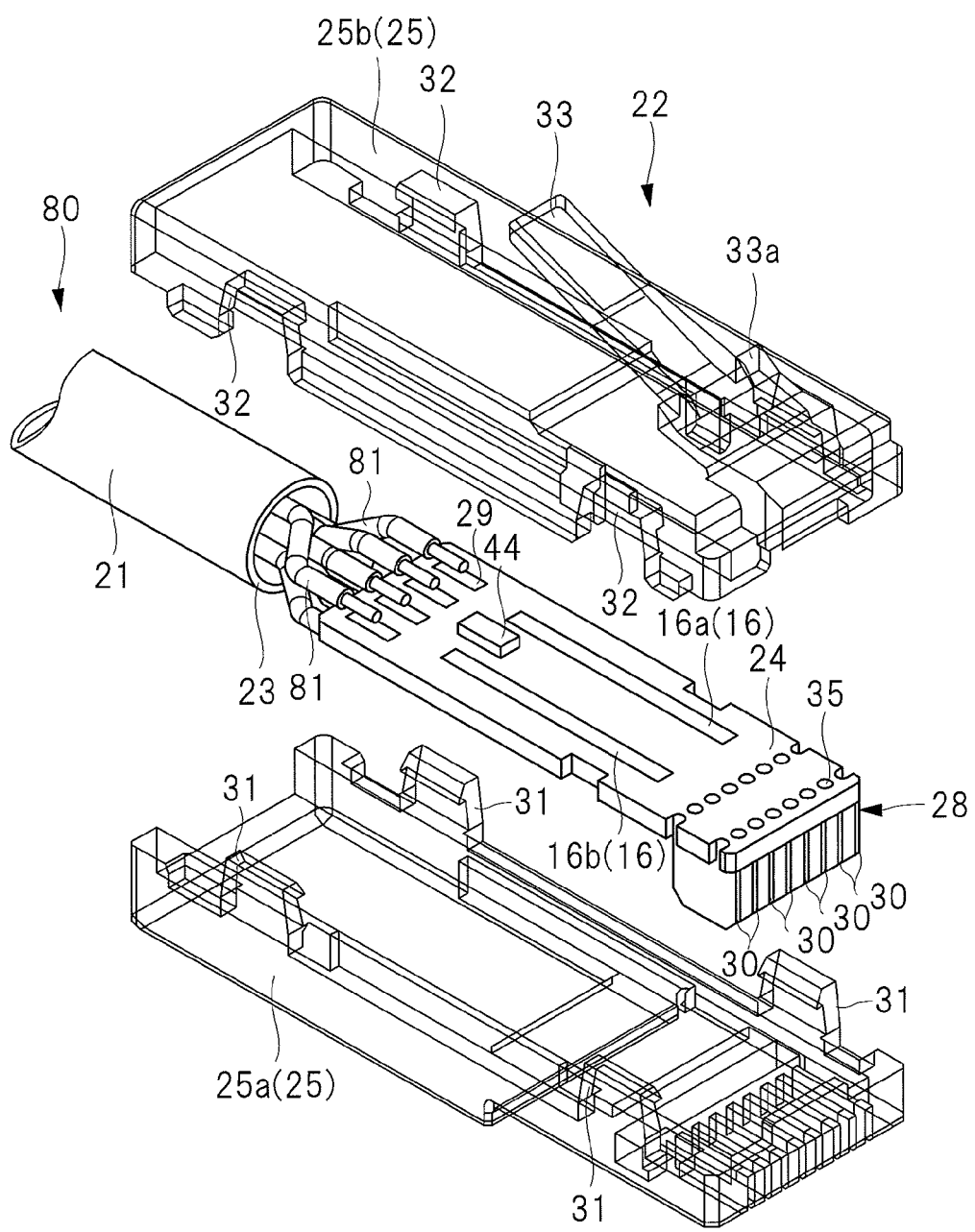
FIG. 11 is a diagram illustrating a configuration example of a connector plug part of the LAN cable of FIG. 10.

FIG. 10 is a diagram illustrating a configuration example of a LAN cable 80 including the communication visualization device 12 of FIG. 1. FIG. 11 is a diagram illustrating a configuration example of a connector plug part 22 of the LAN cable 80 of FIG. 10.

As illustrated in FIGS. 10 and 11, the LAN cable 80 includes a cable part 21 and a connector plug part 22. The cable part 21 includes eight cable lines 81 and an outer covering 23 which covers the cable lines 81.

The cable line 81 includes a wire core formed of, for example, copper and an insulation covering which covers the wire core. Eight cable lines 81 constitute total four pairs, each of which is formed of two cable lines 81.

Two cable lines 81 constituting each pair transfers information through a voltage difference between the two cable lines 81, that is, differential signals. The outer covering 23 and a covering of the cable line 81 are formed of resin, such as polyethylene.

The connector plug part 22 which is a connector plug is a plug connected to a jack connector which is a LAN terminal installed in a USB bus, a server, or the like. The connector plug part 22 includes a plug substrate 24 and a plug case 25.

The plug substrate 24 includes a plurality of substrates which are formed of, for example, a glass-fabric-based epoxy resin or the like, and a multi-layer wiring substrate having a wiring pattern of copper or the like formed between the substrates. The plug substrate 24 has, for example, a rectangular shape as illustrated in FIG. 10 and is a dual side mounting substrate having a principal surface and a rear surface on which electronic components are mounted.

A rectangular terminal 28, and the amplifier circuit 18, the rectifier circuits 17 and 19, and the light-emitting circuit 20 excluding the light-emitting diode 44 which constitute the communication visualization device 12 of FIG. 1 are mounted on the principal surface of the plug substrate (lower side in FIG. 10).

In a peripheral portion of one minor side of the plug substrate 24, four lands 29 are formed in each of the principal surface and the rear surface. The eight cable lines 81 of the LAN cable 80 are respectively connected to the lands 29.

A plurality of through holes 35 are formed in a peripheral portion of the other minor side of the plug substrate 24. The lands 29 connected to the eight cable lines 81 constituting four pairs are respectively connected to the through holes 35 through a wiring pattern (not illustrated) formed in the aforementioned plug substrate 24.

In addition, the lands 29 to which the cable lines 81 constituting certain one pair of the four pairs are connected are also connected to the input parts of the amplifier circuit 18 of the communication visualization device 12 through a differential signal input wiring pattern (not illustrated) formed in the aforementioned plug substrate 24. The differential signal input wiring pattern are the aforementioned branch cable lines 81*a*.

A terminal (not illustrated) is installed in a lower surface of the terminal 28, and is connected to the through hole 35 by, for example, solder. Eight contact electrodes 30 connected to the terminal are installed in parallel on an upper surface of the terminal 28.

The terminal 28 transmits a differential signal input to and output from the through hole 35. As illustrated in FIGS. 10 and 11, the light-emitting diode 44 is mounted near the other minor side of the rear surface of the plug substrate 24 so as to enable visual check from the plug case 25.

The antenna part 16 is formed in the rear surface (upper side in FIG. 11) of the plug substrate 24. The antenna part 16 is formed of a so-called inverse-L antenna in which antennas 16*a* and 16*b* made f a linear wiring pattern are respectively formed near, for example, two major sides of the plug substrate 24. The antenna part 16 transmits a sine wave f1.

The antennas 16*a* and 16*b* are connected to the input parts of the rectifier circuit 17 mounted on the principal surface of the plug substrate 24 through a through hole, a wiring pattern, or the like (not illustrated) formed in the plug substrate 24.

It is desired that electric lengths of the antennas 16*a* and 16*b* are set to have one quarter times a wavelength of a frequency of the sine wave f1 transmitted from the wireless power-feeding device 11 of FIG. 1. In addition, it is possible to reduce an antenna size and therefore a device size by coping with a component having a short wavelength and a high frequency.

The antenna part 16 may be not an antenna, and may be an electromagnetic coupler which supplies power through, for example, electromagnetic induction, that is, a so-called coupler. In addition, the antenna part 16 is formed in a different plug substrate from the plug substrate 24, and may be disposed to overlap the plug substrate 24.

The plug case 25 has, for example, a rectangular shape and is divided into a plug case piece 25*a* and a plug case piece 25*b*. The plug case pieces 25*a* and 25*b* are formed of, for example, colorless transparent plastic. Therefore, it is possible to visually check light emission in the light-emitting diode 44 mounted near the other minor side of the rear surface of the plug substrate 24.

Two attachment pawls 31 are formed in each of major sides of the plug case piece 25*a*. Attachment grooves 32 are respectively formed at positions corresponding to the attachment pawls 31 in the major sides of the plug case piece 25*b*.

The vicinity of an end of one minor side of the plug case piece 25*a* may be shaped such that the terminal 28 is fixed thereto and may be formed such that the contact electrode 30 of the terminal 28 is exposed from the plug case piece 25*a*. The plug case pieces 25*a* and 25*b* are cranked by the attachment pawl 31 installed in the plug case piece 25*a* and the attachment groove 32 installed in the plug case piece 25*b*.

Therefore, the terminal 28 and the plug substrate 24 are sandwiched between the one minor sides of the plug case pieces 25*a* and 25*b*, and an end of the cable part 21 of the LAN cable 80 is inserted between the other minor sides of the plug case pieces 25*a* and 25*b* to fix the plug substrate 24 and the LAN cable 80.

A clamp arm 33 is formed in the one minor side of the plug case piece 25*b*, that is, the minor side on which the terminal 28 is disposed. A pawl 33*a* is formed in the clamp arm 33.

In the case of connection to a jack connector which is a LAN terminal installed in an information communication apparatus, such as a USB bus or a server, the other end side of the plug case 25 is inserted into the connector. Then, the pawl 33*a* formed in the clamp arm 33 is engaged with a grove formed in a connector side and is fixed. In this case, a contact electrode 30 of the terminal 28 which is exposed from the plug case piece 25*a* comes into surface contact with and is electrically conducted with an electrode part installed in a jack connector of the LAN terminal.

In the case of drawing out the plug case 25 from the connector, it is possible to press the clamp arm 33 toward the plug case piece 25*b* and separate the pawl 33*a* from the groove of the connector, removing the plug case 25 from the connector.

Arrangement of the contact electrodes 30 exposed from the plug case piece 25*a* and a shape of the plug case 25 inserted into the jack connector which is the LAN terminal installed in a USB bus, a server, or the like are prescribed by The Electronic Industries Alliance (EIA)/Telecommunications Industry Association (TIA), and conform to, for example, Category 5.

In FIGS. 10 and 11, the amplifier circuit 18, the rectifier circuits 17 and 19, and the light-emitting circuit 20 excluding the light-emitting diode 44 are mounted on a principal surface of the plug substrate 24, and the light-emitting diode 44 is mounted on and the antenna part 16 is formed in the rear surface of the plug substrate 24. However, such a mounting surface is especially not limited as long as the light-emitting diode 44 is located at a position at which light emission check is possible.

Furthermore, since it may be desired that the light emission of the light-emitting diode 44 is easily checked, there is no necessity that the plug case 25 is colorless, and the plug case 25 may be colored and transparent.

<Operation Example of Communication Visualization System>

Next, an operation of the communication visualization system 10 will be described.

In the communication visualization system 10, a sine wave f1 is received from the wireless power-feeding device 11. In the communication visualization device 12, the sine wave f1 received by the antenna part 16 is input to the rectifier circuit 17.

The rectifier circuit 17 performs half-wave rectification or full-wave rectification on the received sine wave f1 and supplies a result of the rectification to the amplifier circuit 18 as driving power of the amplifier circuit 18. The amplifier circuit 18 receives power which is stabilized by using the sine wave f1 received from the wireless power-feeding device 11 as the driving power. In addition, it is possible to suppress degradation of a differential signal and maintain high-quality information communication since power used for light emission of the light-emitting diode 44 is appropriately generated although the power is not generated from the differential signal transferred to the cable line 81.

When information communication is initiated and the LAN cable 80 transfers a communication signal, apart of a differential signal flowing through the cable line 81 at this time is input to the amplifier circuit 18. The amplifier circuit 18 amplifies and outputs the input differential signal.

As described above, the amplifier circuit 18 operates with power supplied from the wireless power-feeding device 11, suppressing degradation of the differential signal flowing through the cable line 81. The rectifier circuit 19 performs, for example, half-wave rectification or full-wave rectification on the differential signal amplified by the amplifier circuit 18 and generates a DC voltage to output the DC voltage to the light-emitting circuit 20.

The light-emitting diode 44 included in the light-emitting circuit 20 emits light by supply of power from the rectifier circuit 19 to the light-emitting circuit 20. In a case where the LAN cable 80 does not transfer a communication signal, the differential signal is not input to the communication visualization device 12. Therefore, the light-emitting diode 44 does not emit light.

When a differential signal is transferred to the LAN cable 80 at the time of information communication, that is, only when information communication is performed in the LAN cable 80, the communication visualization device 12 turns on the light-emitting diode 44. In addition, since the plug case 25 is colorless and transparent, it is possible to check light emission at a glance when the light-emitting diode 44 emits light.

In this manner, a target LAN cable can be easily checked among a plurality of LAN cables 80, preventing the LAN cable 80 from being incorrectly removed, or the like. It is possible to perform work, such as extension or replacement of the LAN cable, in a short time.

By using the sine wave f1 supplied from the wireless power-feeding device 11 as power used to emit the light-emitting diode 44, the communication visualization device 12 can suppress degradation of signal quality of the differential signal transferred to the cable line 81.

Furthermore, only by locating the wireless power-feeding device 11 near the plug case 25 of the LAN cable 80, operation power can be supplied to the amplifier circuit 18 and it is possible to supply stable operation power without requiring power supply equipment. Therefore, it is possible to reduce in cost because of non-requirement of power supply equipment or the like which supplies power to the communication visualization device 12.

Figure 12:
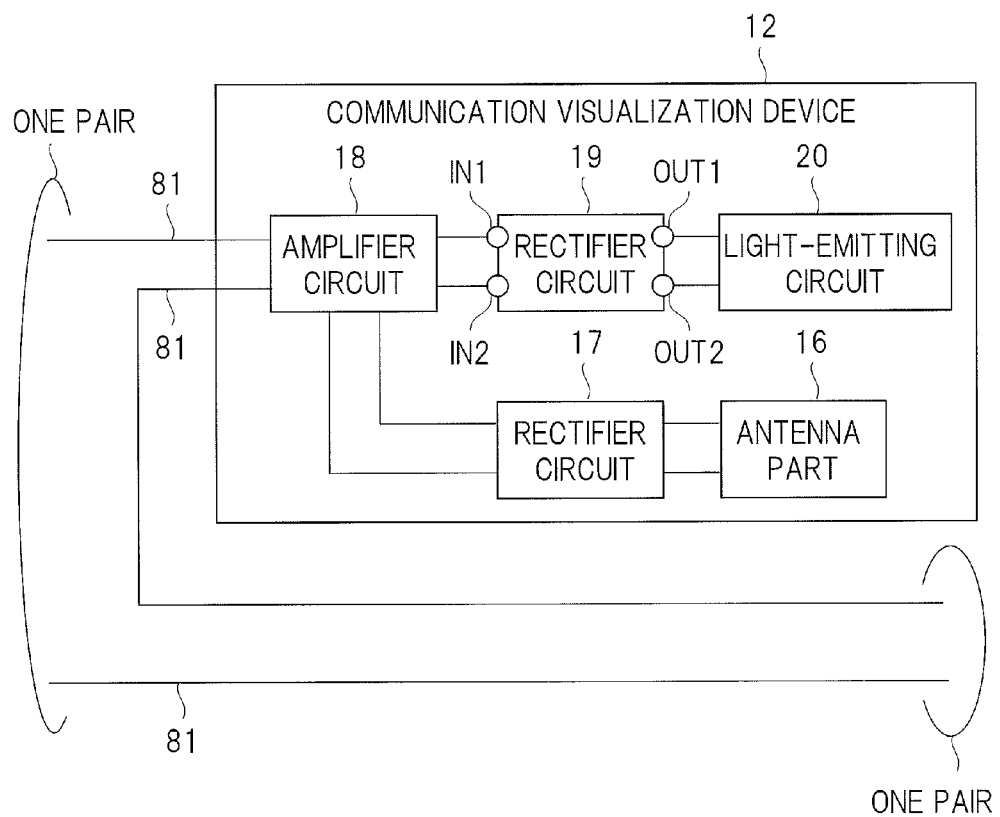
FIG. 12 is a diagram illustrating another connection example of a communication visualization device included in the communication visualization system of FIG. 1.

Although the parallel connection configuration in which the communication visualization device 12 is connected to two cable lines 81 constituting one pair is described in the present first embodiment, the communication visualization device 12 may be connected in series to anyone of the two cable lines 81 constituting one pair, for example, as illustrated in FIG. 12.

Second Embodiment

<Overview>

In a data center or the like, in order to facilitate change or extension of a LAN cable wiring, extension of a LAN cable, or the like and therefore, improve maintainability, an extension adapter which connects two LAN cables, or a wiring panel, that is, a so-called patch panel which concentrates and connects a plurality of LAN cables has been widely used. Therefore, in the present second embodiment, a technology of installing the communication visualization device 12 in the extension adapter and the patch panel will be described.

<Configuration of Extension Adapter>

Figure 13A:
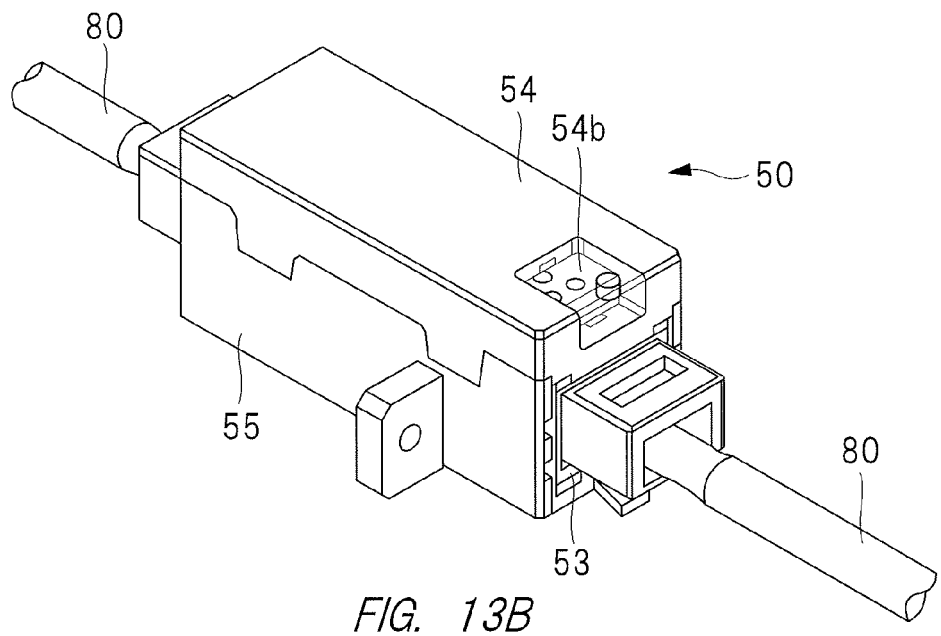
FIGS. 13A and 13B are diagrams illustrating a configuration example of an extension adapter including a communication visualization device according to a second embodiment.
Figure 13B:
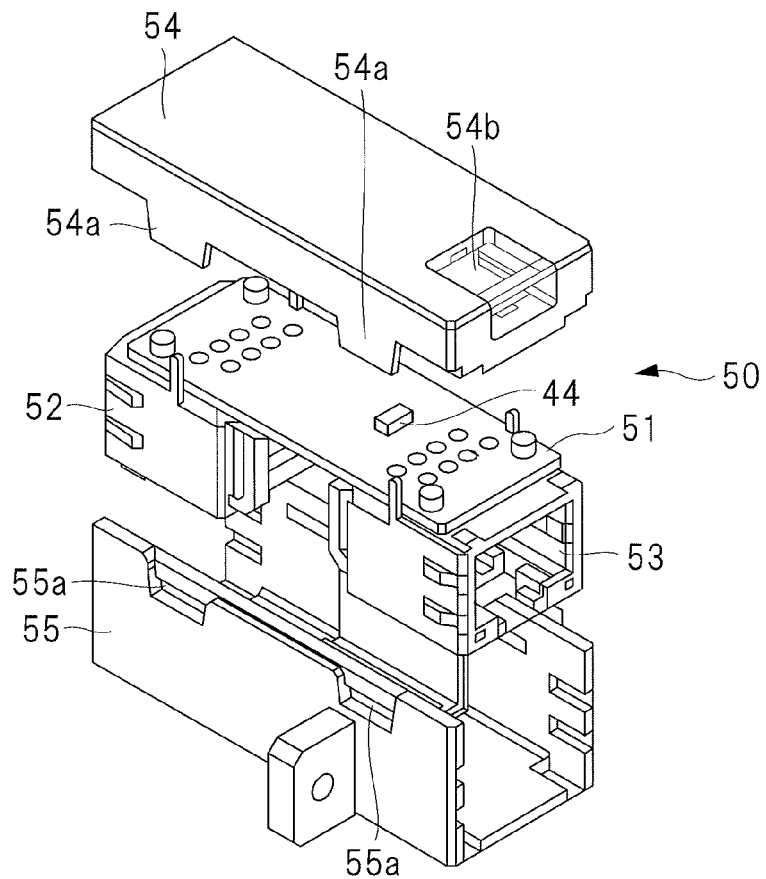

FIGS. 13A and 13B are diagrams illustrating a configuration example of an extension adapter 50 including the communication visualization device 12, according to the present second embodiment;

The extension adapter 50 is an adapter which connects two LAN cables 80 to achieve extension, and facilitates extension of a LAN cable or the like in a data center or the like.

As illustrated in FIG. 13B, the extension adapter 50 includes a jack substrate 51 having, for example, a rectangular shape. The jack substrate 51 is a dual-side mounting substrate including a plurality of substrates which are formed of, for example, a glass-fabric-based epoxy resin or the like, and a multi-layer wiring substrate having a wiring pattern of copper or the like formed between the substrates.

A jack connector 52 is mounted on one minor side principal surface of the jack substrate 51. A jack connector 53 is mounted on the other minor side principal surface of the jack substrate 51. As illustrated in FIG. 13A, the LAN cable 80 is connected to the jack connectors 52 and 53.

The jack connector 52 and the jack connector 53 are connected by a wiring pattern (not illustrated) which is formed in a rear surface of the jack substrate 51 or the like. The communication visualization device 12 included in the communication visualization system 10 of the first embodiment illustrated in FIG. 1 is mounted on the jack substrate 51.

The amplifier circuit 18, the rectifier circuits 17 and 19, and the light-emitting circuit 20 excluding the light-emitting diode 44, which are included in the communication visualization device 12 illustrated in FIG. 1, are mounted on, for example, a principal surface of the jack substrate 51. In the communication visualization device 12, the light-emitting diode 44 included in the light-emitting circuit 20 is mounted near the other minor side of the rear surface of the jack substrate 51. In addition, antennas 16a and 16b constituting the antenna part 16 illustrated in FIG. 1 are formed in the rear surface of the jack substrate 51 by the wiring pattern. The mounting and the configuration are similar to those of FIG. 11.

The jack substrate 51, on which the communication visualization device 12 and the jack connectors 52 and 53 are mounted, is fixed by two jack connector case pieces 54 and 55 constituting a jack connector case.

Two attachment pawls 54a are formed in each of two major sides of the jack connector case piece 54. Attachment grooves 55a are respectively formed at positions corresponding to the attachment pawls 54a in the major sides of the jack connector case piece 55.

The jack connector case is configured by the jack connector case piece 54 and the jack connector case piece 55 through engagement between the attachment pawls 54a and the attachment grooves 55a. The jack substrate 51 on which the jack connector case pieces 54 and 55 and the communication visualization device 12 is sandwiched between and fixed to the jack connector case pieces 54 and 55. Therefore, the extension adapter 50 is formed.

A light emission check window 54b is formed in a partial region of the jack connector case piece 54. The light emission check window 54b is formed of, for example, a colorless and transparent plastic cover and the like. The partial region of the jack connector case piece 54 in which the light emission check window 54b is formed is located at a position near the other minor side of the rear surface of the jack substrate 51, that is, a position at which the light-emitting diode 44 is mounted.

By using the light emission check window 54b, light emission in the light-emitting diode 44 can be easily and visually checked. A wiring pattern connected to the cable lines 81 (illustrated in FIG. 1) constituting certain one pair among wiring patterns connecting the jack connector 52 and the jack connector 53 is also connected to the amplifier circuit 18 of the communication visualization device 12. Other connection configurations of the communication visualization device 12 are similar to those illustrated in FIG. 1.

Therefore, the communication visualization device 12 is incorporated in the extension adapter 50, leading to non-requirement of a dedicated LAN cable or the like. Accordingly, it is possible to reduce cost.

In addition, since an existing LAN cable can be used, it is possible to visually determine whether the LAN cable 80 is transferring a communication signal only by connecting the LAN cable to the extension adapter 50. Accordingly, it is possible to easily perform work, such as extension or replacement of the LAN cable, in a short time, without requiring special work or the like.

In addition, similarly to the first embodiment, it is possible to visually determine whether the LAN cable 80 is transferring a communication signal. Furthermore, it is possible to suppress degradation of a differential signal and maintain high-quality information communication since power used for light emission of the light-emitting diode 44 is appropriately generated although the power is not generated from the differential signal transferred to the cable line 81.

Moreover, a target LAN cable can be easily checked among LAN cables 80 connected to a plurality of extension adapters 50, preventing the LAN cable 80 from being incorrectly removed, or the Like.

<Configuration Example of Patch Panel>

Next, a patch panel including a communication visualization device will be described.

Figure 14:
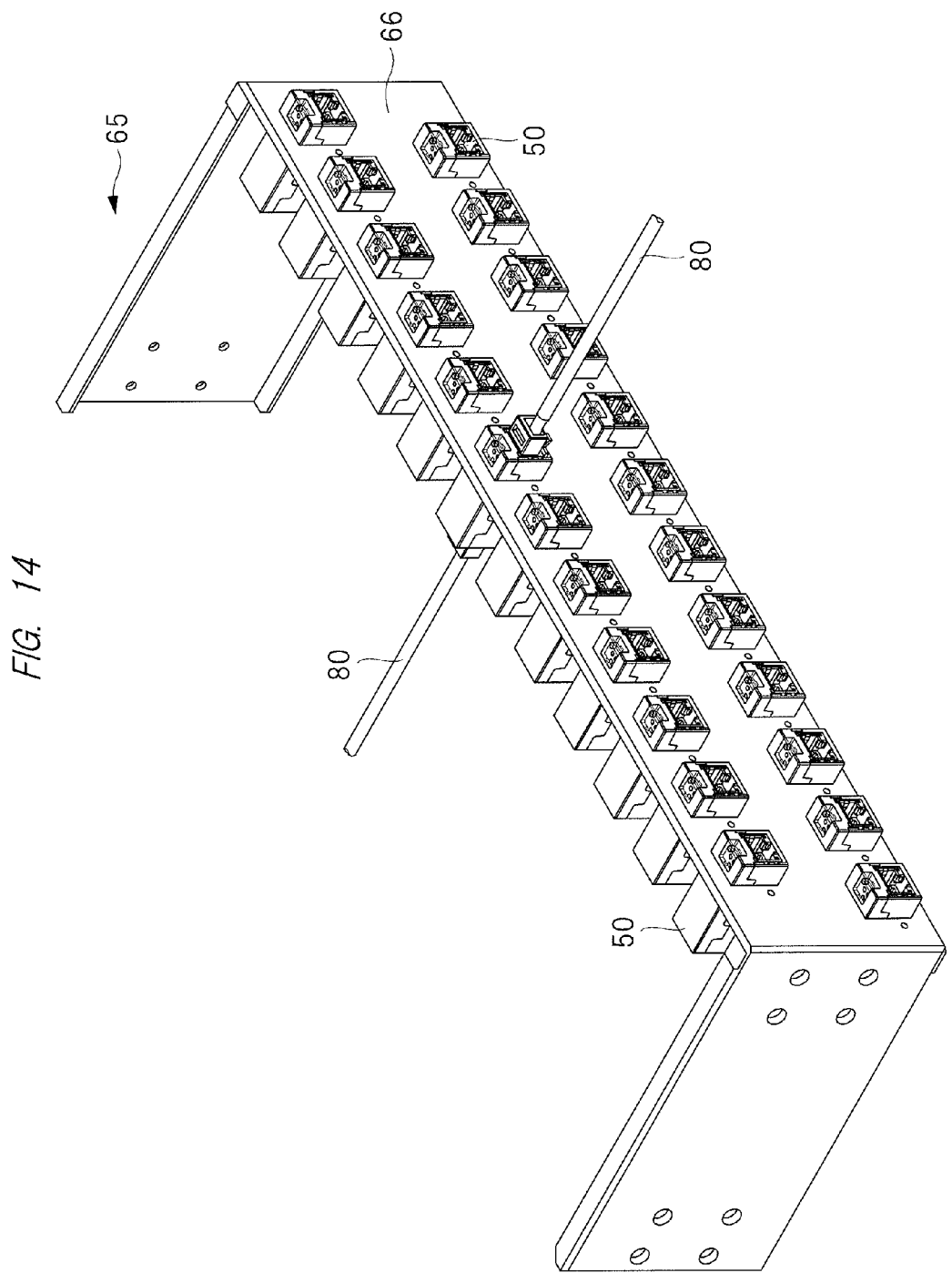
FIG. 14 is a diagram illustrating an example of a patch panel configured by using the extension adapter of FIGS. 13A and 13B.

FIG. 14 is a diagram illustrating an example of a patch panel 65 configured by using the extension adapter 50 of FIGS. 13A and 13B.

The patch panel 65 is a wiring panel which concentrates LAN cables in, for example, a data center, in order to facilitate change or extension of a LAN cable wiring or the like and therefore, improve maintainability.

As illustrated in FIG. 14, the patch panel 65 has a configuration in which a plurality of extension adapters 50 as illustrated in FIGS. 13A and 13B are arranged in, for example, two upper and lower rows on the front panel 66. Although 12 extension adapters 50 are illustrated as being arranged in each row in FIG. 14, the number of the extension adapters 50 and the number of arrangement rows are especially not limited.

Due to this configuration, only by locating the wireless power-feeding device 11 near the patch panel 65, power can be supplied to the amplifier circuit 18 of the communication visualization device 12 of FIG. 1, and it is possible to visually determine whether the LAN cable 80 is transferring a communication signal.

Therefore, when a wiring of the LAN cables 80 is changed, it is possible to easily confirm a removal target LAN cable among a plurality of LAN cables 80 connected to the patch panel 65, resulting in improvement of workability upon change of the wiring or the like. In addition, it is possible to improve quality of information communication.

Furthermore, the communication visualization device 12 is incorporated in the extension adapter 50 installed in the patch panel 65, leading to non-requirement of a dedicated LAN cable and reduction in cost.

Figure 15:
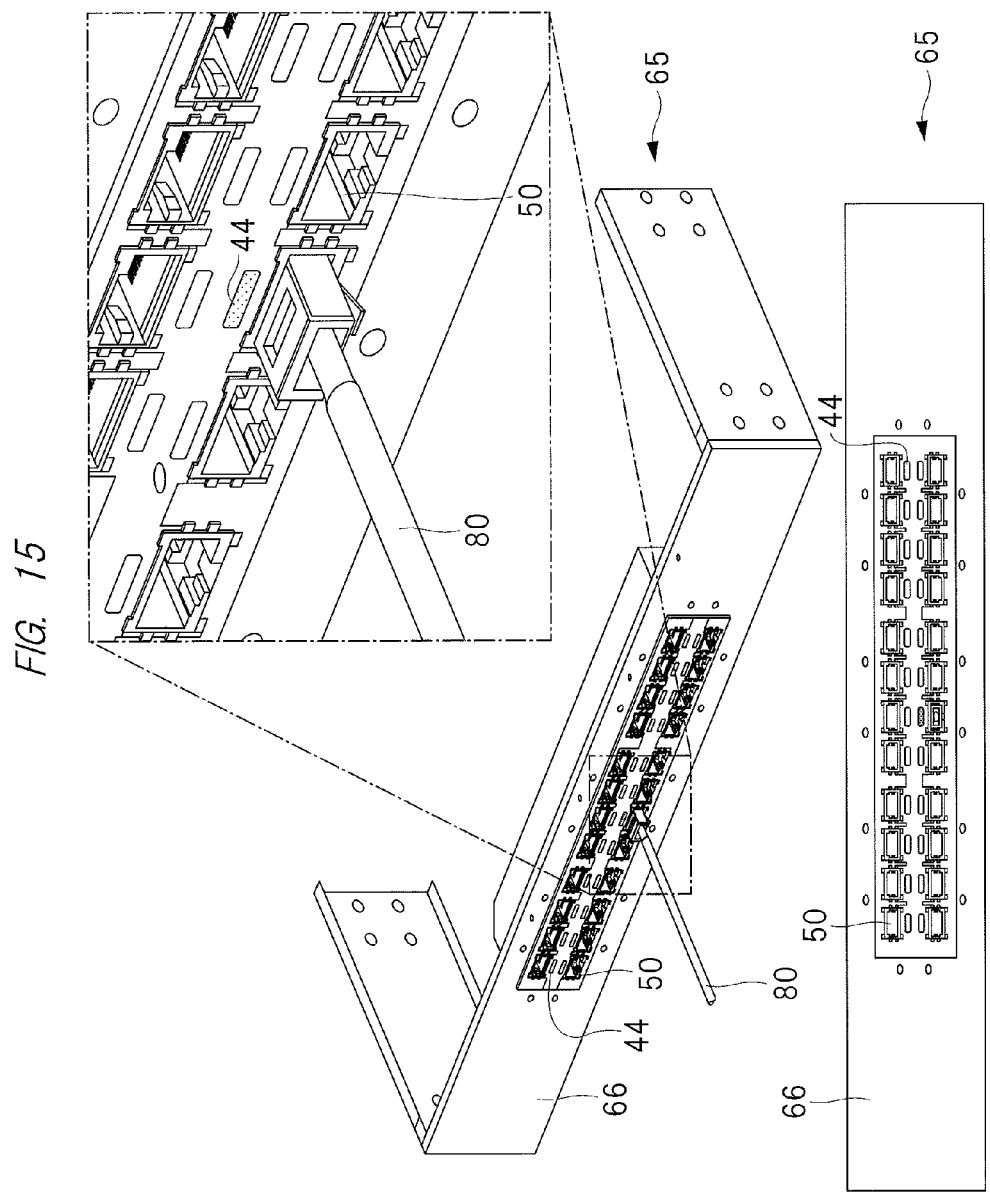
FIG. 15 is a diagram illustrating another configuration example of the patch panel of FIG. 14.

Although the communication visualization device 12 is installed in each of the extension adapters 50 in FIG. 14, an adapter module type may be employed as illustrated in FIG. 15.

In this case, the patch panel 65 includes two panel substrates (not illustrated). The panel substrate has a module configuration in which a plurality of extension adapters 50 are mounted at equal intervals.

The communication visualization device 12 has, for example, the same configuration as illustrated in FIG. 3. As illustrated in FIG. 15, the light-emitting diode 44 is disposed in the front panel 66 included in the patch panel 65.

The communication visualization device 12 may be mounted on the jack substrate 51 included in the extension adapter 50 or may be mounted on the panel substrate, not the jack substrate 51.

Accordingly, when information communication is initiated and the LAN cable 80 transfers a communication signal, it is possible to visually determine whether the LAN cable 80 is transferring the communication signal through the light-emitting diode installed in the front panel 66.

Third Embodiment

<Overview>

In the first and second embodiments, there has been described a configuration of suppressing signal degradation of a differential signal transferred to the cable line 81 by supplying external power to the amplifier circuit 18 by the wireless power-feeding device 11. In the present third embodiment, there will be described a technology of further suppressing signal degradation of the differential signal.

(Configuration Example of Communication Visualization Device)

Figure 16:
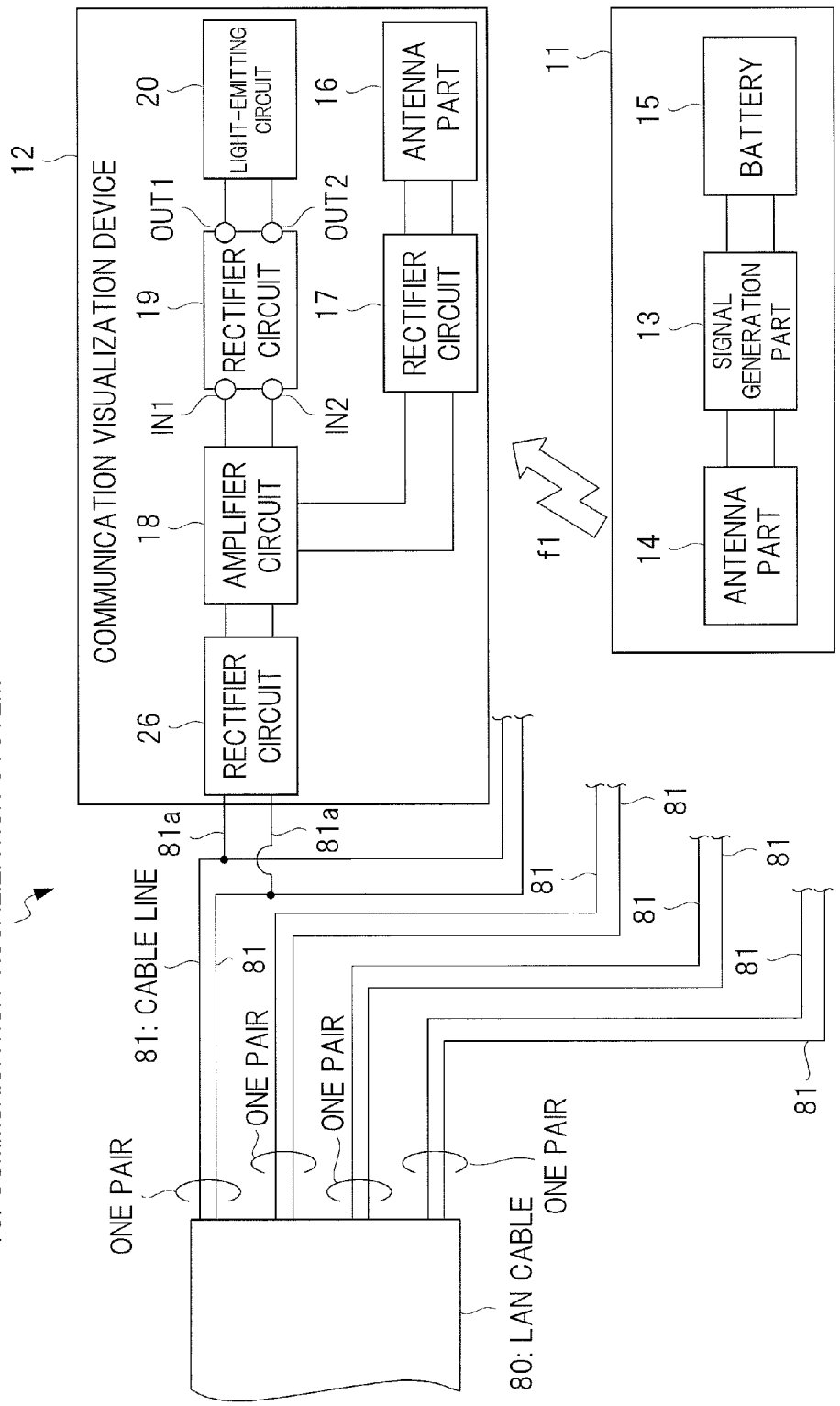
FIG. 16 is a diagram illustrating a configuration example of a communication visualization system according to a third embodiment of the present invention.

FIG. 16 is a diagram illustrating a configuration example of a communication visualization system 10 according to the present third embodiment.

As illustrated in FIG. 16, the communication visualization system 10 includes a wireless power-feeding device 11 and a communication visualization device 12. Since a configuration of the wireless power-feeding device 11 is similar to that of the first embodiment in FIG. 1, a description thereof will be omitted.

The communication visualization device 12 further includes a matching circuit 26 in addition to the configuration in FIG. 1 including the antenna part 16, the rectifier circuits 17 and 19, the amplifier circuit 18, and the light-emitting circuit 20. The matching circuit 26 which is a matching part limits current flowing through the amplifier circuit 18. Therefore, signal degradation of a differential signal transferred to the cable line 81 is suppressed.

The differential signals transferred to two cable lines 81 constituting certain one pair are input to the matching circuit 26. Input parts of the amplifier circuit 18 are respectively connected to output parts of the matching circuit 26. Since other connection configurations are similar to those of the first embodiment in FIG. 1, a description thereof will be omitted.

<Configuration Example and Operation of Matching Circuit>

Figure 17:
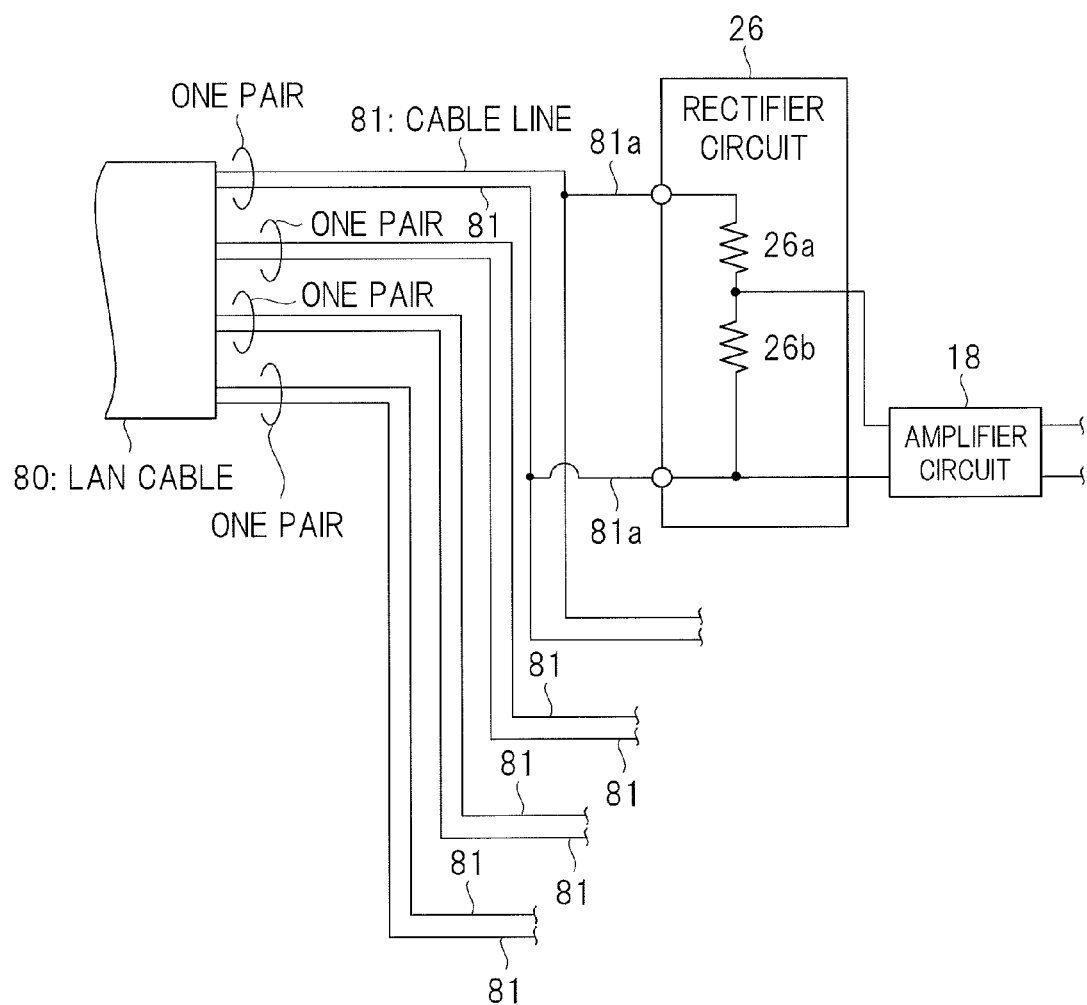
FIG. 17 is a diagram illustrating a circuit configuration example of a matching circuit provided in a communication visualization device of FIG. 16.

FIG. 17 is a diagram illustrating a circuit configuration example of a matching circuit 26 provided in the communication visualization device 12 of FIG. 16.

As illustrated in FIG. 17, the matching circuit 26 includes resistors 26a and 26b. One of the cable lines 81 constituting one pair are connected to one connection part of the resistor 26a. One connection part of the resistor 26b is connected to the other connection part of the resistor 26a, and the other of the cable lines 81 constituting one pair is connected to the other connection part of the resistor 26b.

A connection portion between the resistor 26a and the resistor 26b and the other connection part of the resistor 26b become output parts of the matching circuit 26, to which input parts of the amplifier circuit 18 are respectively connected. In addition, resistance values of the resistors 26a and 26b are set to values that are sufficiently larger than an impedance of the cable line 81, for example, about 100Ω.

A differential signal input from the cable lines 81 is divided by the resistors 26a and 26b of the matching circuit 26. As described above, the resistance values of the resistors 26a and 26b are set to values that are sufficiently larger than the impedance of the cable line 81 (for example, about 100Ω), and are in a high-impedance state.

Therefore, a current value of the differential signal output to the matching circuit 26 to the amplifier circuit 18 is considerably limited. The amplifier circuit 18 amplifies the input differential signal. Subsequent operation is similar to that described with reference to FIG. 1. In addition, the communication visualization device 12 of FIG. 16 is installed in the LAN cable 80, the extension adapter 50, or the patch panel 65, similarly to the above-described first and second embodiments.

Thus, a current that is weaker than that in the configuration of FIG. 1 according to the aforementioned first embodiment is only extracted from the cable line 81, considerably suppressing quality degradation in the differential signal in the cable line 81.

In this way, it is possible to more suppress quality degradation of a communication signal transferred by the LAN cable 80, and improve quality of information communication.

Although the matching circuit 26 is illustrated as including the resistors 26a and 26b in FIG. 17, the matching circuit 26 may be formed in a high-impedance state by an LC circuit including an inductor, a capacitor, and the like. In this case, the matching circuit is a so-called n-type matching circuit or the like, and may use an inductor instead of a capacitor, and a capacitor instead of an inductor in a matching state.

Fourth Embodiment

<Overview>

External power is supplied to the amplifier circuit 18 by the wireless power-feeding device 11 in the above-described first to third embodiments, but a technology of supplying power to the amplifier circuit 18 in a wired manner will be described in a present fourth embodiment.

<Configuration Example of Communication Visualization Device>

Figure 18:
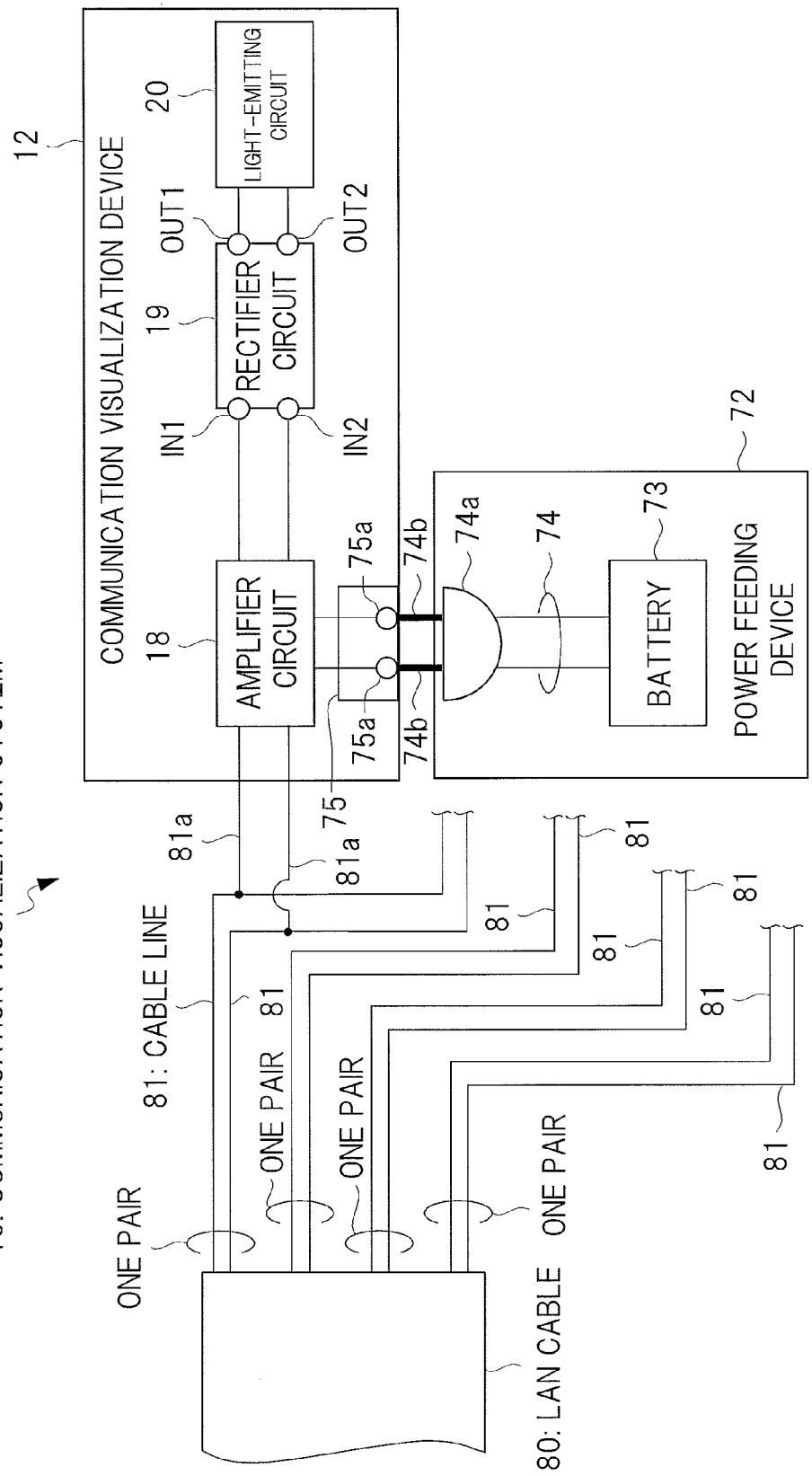
FIG. 18 is a diagram illustrating a configuration example of a communication visualization system according to a fourth embodiment of the present invention.

FIG. 18 is a diagram illustrating a configuration example of a communication visualization system 10 according to the present fourth embodiment.

Referring to FIG. 18, the communication visualization system includes a power-feeding device 72 and a communication visualization device 12. The power-feeding device 72 includes a battery 73 which supplies a DC voltage and a cable 74 connected to the battery 73. A connector 74a is installed in a tip part of the cable 74. A male terminal 74b is installed in the connector 74a.

The communication visualization device 12 has a configuration including an amplifier circuit 18, a rectifier circuit 19, and a light-emitting circuit 20, in which a connector 75 is installed. The connector 75 is connected to the amplifier circuit 18.

The connector 75 is coupled to and electrically connected to the connector 74a of the power-feeding device 72. Therefore, the DC voltage from the power-feeding device 72 is supplied to the amplifier circuit 18. The amplifier circuit 18 uses the DC voltage supplied from the power-feeding device 72 as operation power.

Other connection configurations of the amplifier circuit 18, the rectifier circuit 19, and the light-emitting circuit 20 in the communication visualization device 12 are similar to those illustrated in FIG. 1. The rectifier circuit 19 becomes a rectifying part.

Due to this configuration, power is certainly supplied to the amplifier circuit 18 by the cable 74, more improving reliability of the communication visualization system 10.

The power-feeding device 72 may be formed integrally with the battery 73 and the connector 74a, without using the cable 74.

Figure 19:
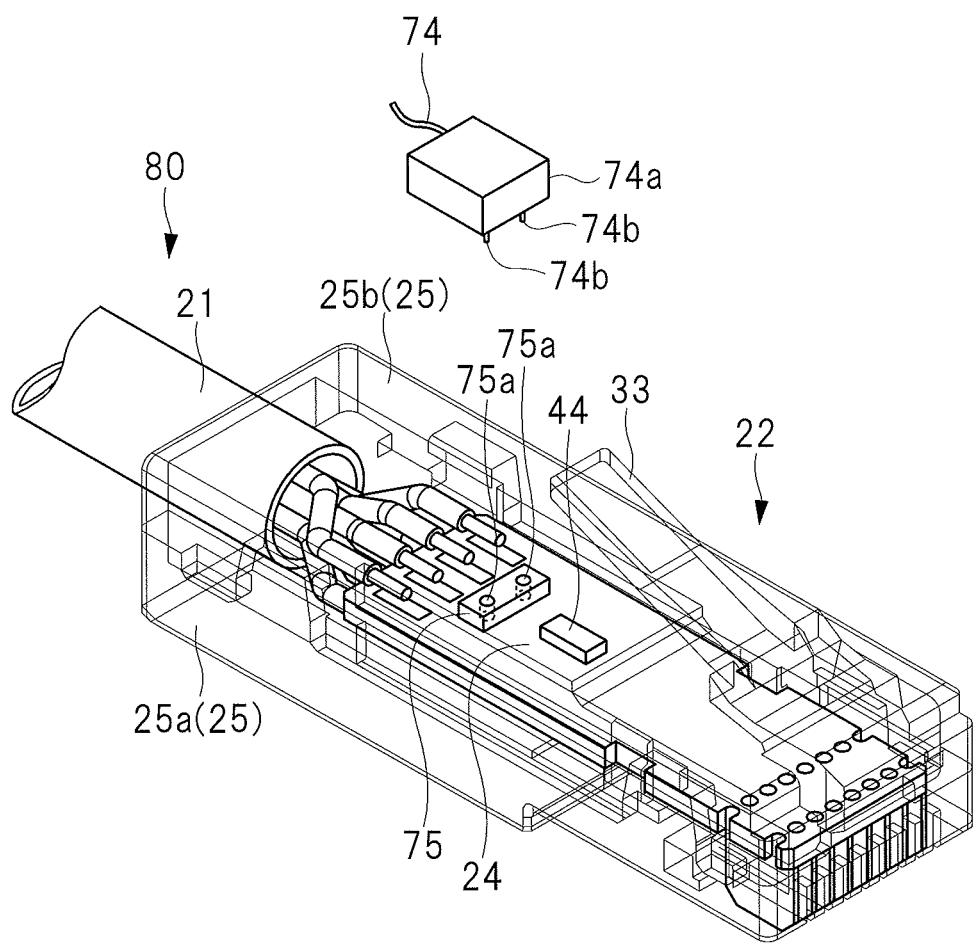
FIG. 19 is a diagram of a LAN cable including a communication visualization device of FIG. 18.

FIG. 19 is a diagram of a LAN cable 80 including the communication visualization device 12 of FIG. 18.

The connector 75 is mounted on, for example, a rear surface of a plug substrate 24. The connector 75 includes a female terminal 75a installed therein. The male terminal 74b included in the connector 74a of the power-feeding device 72 is inserted into the female terminal 75a to achieve electrical connection.

The female terminal 75a is installed to be exposed to an upper surface of a plug case piece 25b constituting an upper surface of a plug case 25 of the LAN cable 80, that is, the plug case 25.

When power is supplied to the amplifier circuit 18 of the communication visualization device 12, the connector 74a is inserted into the connector 75 to achieve electrical connection.

The connector 75 is configured such that the female terminal 75a is directly connected to the plug substrate 24 as illustrated in FIG. 19, or is connected to the plug substrate 24 through a cable or the like (not illustrated).

The plug substrate 24 is configured similarly to that of FIG. 10, except that the antenna part 16 and the rectifier circuit 17 are not installed and power supplied from the connector 75 is supplied to the amplifier circuit 18, instead of supply of power from the rectifier circuit 17 to the amplifier circuit 18.

Figure 20:
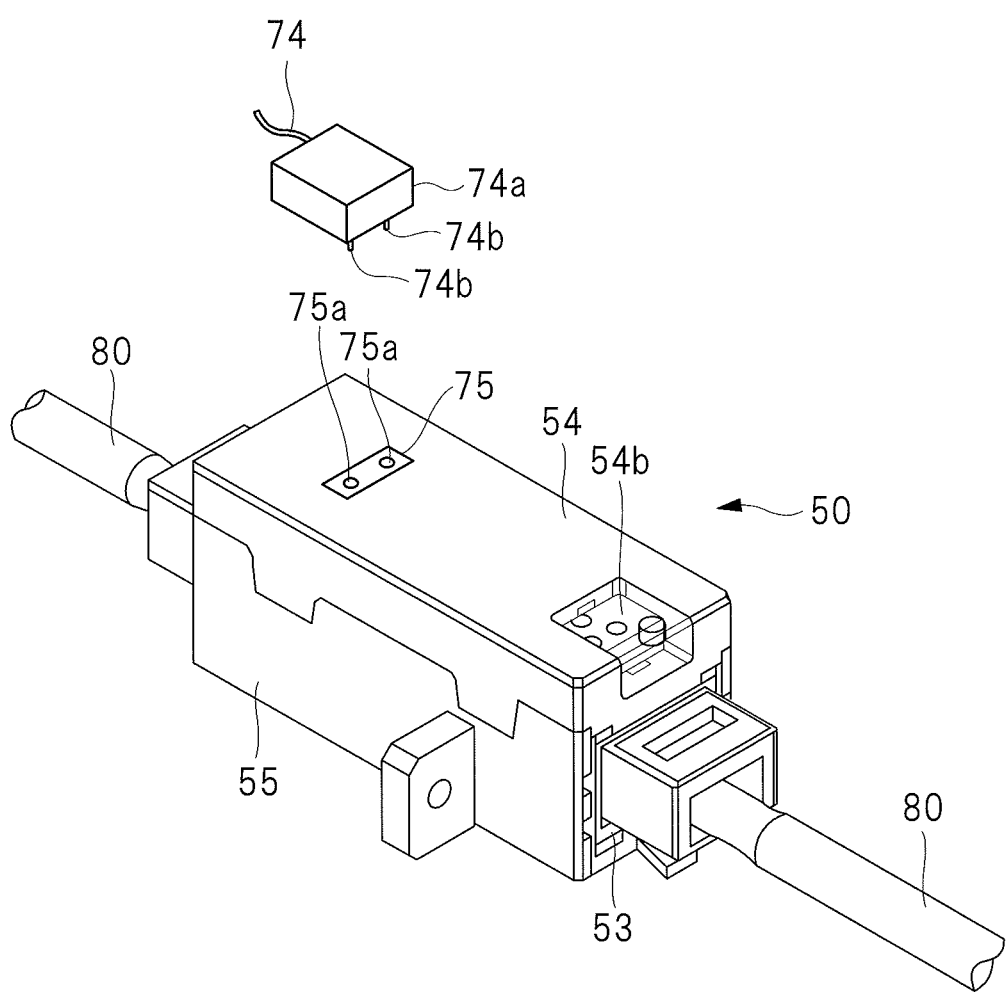
FIG. 20 is a diagram of an extension adapter including the communication visualization device of FIG. 18.

FIG. 20 is a diagram of an extension adapter 50 including the communication visualization device 12 of FIG. 18.

In this case, as illustrated in FIG. 20, the connector 75 is formed in an upper surface of a jack connector case piece 54. The connector 75 includes a female terminal 75a having therein a hole which is coupled to the connector 74a included in the power-feeding device 72.

The connector 75 is configured such that the female terminal 75a is directly connected to the jack substrate 51 illustrated in FIGS. 13A and 13B, or is connected to the jack substrate 51 through a cable or the like (not illustrated).

The jack substrate 51 is configured similarly to that of FIGS. 13A and 13B, except that the antenna part 16 and the rectifier circuit 17 are not installed, and power supplied from the connector 75 is supplied to the amplifier circuit 18, instead of supply of power from the rectifier circuit 17 to the amplifier circuit 18.

Figure 21:
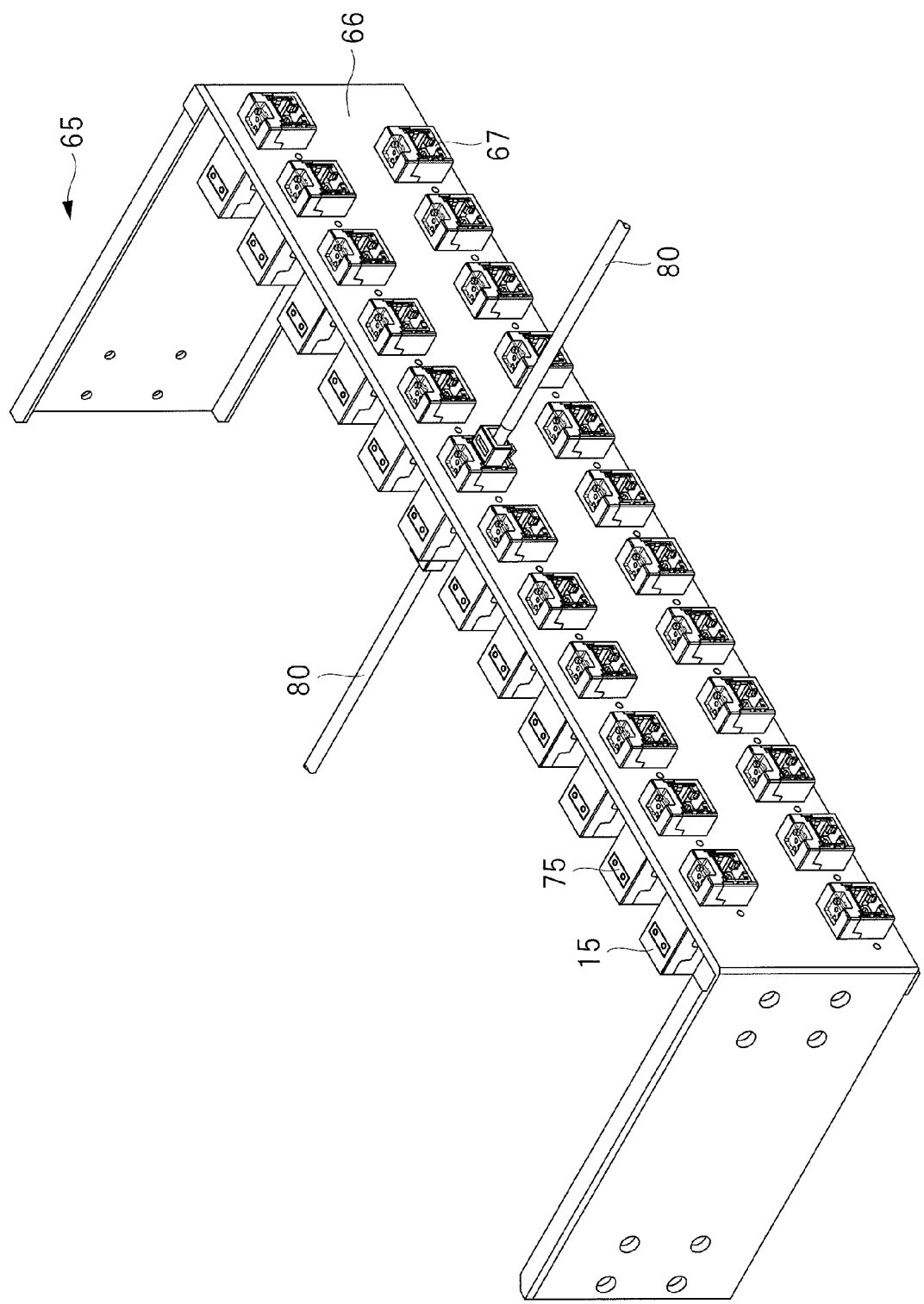
FIG. 21 is a diagram illustrating an example of a patch panel configured by using the extension adapter of FIG. 20.

FIG. 21 is a diagram illustrating an example of a patch panel 65 configured by using the extension adapter 50 of FIG. 20.

In this case, as illustrated in FIG. 21, the patch panel 65 has a configuration in which a plurality of extension adapters 50 as illustrated in FIG. 20 are arranged in, for example, two upper and lower rows on a front panel 66. Although 12 extension adapters 50 are illustrated as being arranged in each row in FIG. 21, the number of the extension adapters 50 and the number of arrangement rows are especially not limited.

When power is supplied to the amplifier circuit 18 of the communication visualization device 12, the male terminal 74b included in the power-feeding device 72 is inserted into and coupled to the female terminal 75a of the connector 75.

In addition, as illustrated in FIG. 15, the patch panel 65 may have an adapter module type.

Also in this case, the patch panel 65 includes two panel substrates, and the panel substrate has a module configuration in which a plurality of extension adapters 50 are mounted at equal intervals. The communication visualization device 12 has, for example, the same configuration as illustrated in FIG. 18. In addition, the light-emitting diode 44 is disposed in, for example, the front panel 66 included in the patch panel 65.

In the module configuration, the connector 75 to which the connector 74a of the power-feeding device 72 is connected is installed in, for example, the front panel 66. The connector 75 is connected to a wiring pattern formed in the panel substrate. The wiring pattern is a common wiring for supplying operation power to each amplifier circuit 18.

In addition, the communication visualization device 12 illustrated in FIG. 18 is mounted on the panel substrate. Therefore, one connector is only installed in the front panel, and therefore, it is possible to supply the operation power to the amplifier circuit 18. Accordingly, the number of connectors 75 can be reduced, resulting in reduction in cost.

As described above, the operation power of the amplifier circuit 18 is supplied from the power-feeding device 72 in a wired manner, realizing stable supply of power. Therefore, it is possible to further improve reliability of the communication visualization system 10.

In the foregoing, the invention made by the inventor of the present invention has been concretely described based on the embodiments. However, it goes without saying that the present invention is not limited to the foregoing embodiments and various modifications and alterations can be made within the scope of the present invention.

Note that the present invention is not limited to the embodiments described above, but includes various modification examples. For example, the embodiments above have been described in detail so as to make the present invention easily understood, and the present invention is not limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A communication visualization system comprising:
a wireless power-feeding device for transmitting electromagnetic energy in a wireless manner; and
a communication visualization device for notifying that a communication cable connected to an information communication apparatus is performing information communication at time of information communication,
wherein the communication visualization device includes:
an antenna part for receiving the electromagnetic energy transmitted from the wireless power-feeding device;
a first rectifying part for rectifying the electromagnetic energy received by the antenna part to generate a direct current (DC) voltage;
an amplifying part for amplifying a part of a communication signal transferred to the communication cable at time of information communication by using the DC voltage generated by the first rectifying part as operation power;
a second rectifying part for converting the communication signal amplified by the amplifying part into a DC voltage; and
a light-emitting part for emitting light based on the DC voltage obtained by conversion by the second rectifying part.

2. The communication visualization system according to claim 1,
wherein the communication signal input to the amplifying part is a pair of differential signals transmitted from the information communication apparatus which performs communication.

3. The communication visualization system according to claim 1,
wherein the communication visualization device further includes a matching part for limiting a current value of the communication signal flowing through the amplifying part.

4. The communication visualization system according to claim 1,
wherein the communication visualization device is accommodated in a connector plug included in the communication cable.

5. The communication visualization system according to claim 1,
wherein the communication visualization device is installed in an extension adapter for connecting the communication cables to achieve extension.

6. The communication visualization system according to claim 1,
wherein the communication visualization device is installed in a wiring panel for concentrating a plurality of communication cables.

7. A communication visualization system comprising:
a power-feeding device for supplying power; and
a communication visualization device for notifying that a communication cable connected to an information communication apparatus is performing information communication at time of information communication,
wherein the communication visualization device includes:
an amplifying part for amplifying a part of a communication signal transferred to the communication cable at time of information communication;
a rectifying part for converting the communication signal amplified by the amplifying part into a direct current (DC) voltage; and
a light-emitting part for emitting light based on the DC voltage obtained by conversion by the rectifying part, and
wherein the amplifying part operates with power supplied from the power-feeding device,
the communication cable includes two cable lines which constitute a pair and to which differential signals are transferred as communication signals, and
one branch cable line is branched from each of the two cable lines and a part of the differential signals transferred to the two cable lines are input to the amplifying part via the two branch cable lines.

8. The communication visualization system according to claim 7,
wherein the communication signal inputted to the amplifying part is a pair of differential signals transmitted from the information communication apparatus which performs communication.

9. The communication visualization system according to claim 7,
wherein the communication visualization device further includes a matching part for limiting a current value of the communication signal flowing through the amplifying part.

10. The communication visualization system according to claim 7,
wherein the communication visualization device is accommodated in a connector plug included in the communication cable.

11. The communication visualization system according to claim 7,
wherein the communication visualization device is installed in an extension adapter for connecting the communication cables to achieve extension.

12. The communication visualization system according to claim 7,
wherein the communication visualization device is installed in a wiring panel which concentrates a plurality of the communication cables.

* * * * *